(12) United States Patent
Dayton

(10) Patent No.: US 9,949,592 B2
(45) Date of Patent: Apr. 24, 2018

(54) AGITATION ASSEMBLY

(71) Applicant: Anastasia B. Dayton, Laramie, WY (US)

(72) Inventor: Anastasia B. Dayton, Laramie, WY (US)

(*) Notice: Subject to any disclaimer, the term of this patent is extended or adjusted under 35 U.S.C. 154(b) by 0 days.

(21) Appl. No.: 14/681,942

(22) Filed: Apr. 8, 2015

(65) Prior Publication Data
US 2015/0290605 A1 Oct. 15, 2015

Related U.S. Application Data

(60) Provisional application No. 61/977,376, filed on Apr. 9, 2014, provisional application No. 62/046,049, filed on Sep. 4, 2014.

(51) Int. Cl.
  B01F 13/00 (2006.01)
  A47J 31/00 (2006.01)
  A47J 31/44 (2006.01)
  B01F 15/00 (2006.01)

(52) U.S. Cl.
  CPC ....... *A47J 31/4403* (2013.01); *B01F 13/0022* (2013.01); *B01F 13/0052* (2013.01); *B01F 15/00512* (2013.01); *B01F 2215/0022* (2013.01)

(58) Field of Classification Search
  CPC ...... A47J 43/27; B01F 13/002; B01F 13/0018
  USPC ......................................... 366/130, 342, 276
  See application file for complete search history.

(56) References Cited

U.S. PATENT DOCUMENTS

| 1,954,093 | A | * | 4/1934 | Nelson | ................ | B01F 7/00641 |
| | | | | | | 366/343 |
| 3,384,354 | A | * | 5/1968 | Migule | .................. | B01F 11/04 |
| | | | | | | 366/118 |
| 4,832,501 | A | | 5/1989 | McCauley | | |
| 5,160,058 | A | | 11/1992 | Ahn | | |
| 5,586,676 | A | | 12/1996 | Lynd | | |
| 6,142,326 | A | | 11/2000 | Cornell et al. | | |
| 6,379,032 | B1 | | 4/2002 | Sorensen | | |
| 2003/0029827 | A1 | | 2/2003 | Renz | | |
| 2006/0250887 | A1 | * | 11/2006 | Vernon | .................... | A47J 43/10 |
| | | | | | | 366/130 |
| 2010/0302897 | A1 | * | 12/2010 | George | ............... | A47J 43/1025 |
| | | | | | | 366/130 |
| 2011/0042343 | A1 | | 2/2011 | Bartucci | | |
| 2013/0341297 | A1 | | 12/2013 | Stephan et al. | | |

FOREIGN PATENT DOCUMENTS

| KR | 10-2009-0006656 A | 1/2009 |
| WO | 97/07724 A1 | 3/1997 |

* cited by examiner

*Primary Examiner* — Tony G Soohoo
*Assistant Examiner* — Anshu Bhatia
(74) *Attorney, Agent, or Firm* — Kirton McConkie; David R. Conklin

(57) ABSTRACT

The present invention relates to a container-insertable agitation device comprised of a tether having a first end coupled to a container and a second end coupled to an agitator device, wherein the agitator device is suspended within the interior of the container via the tether.

19 Claims, 20 Drawing Sheets

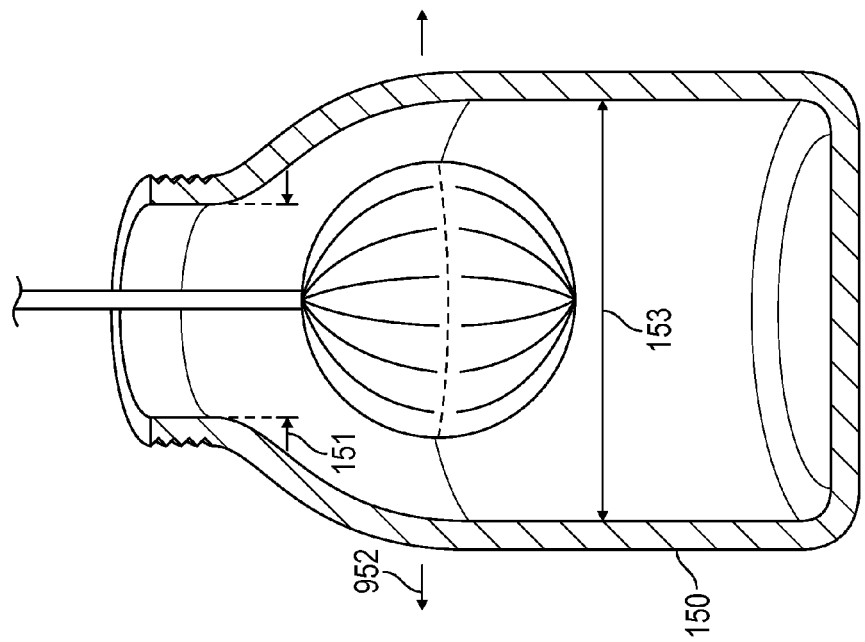
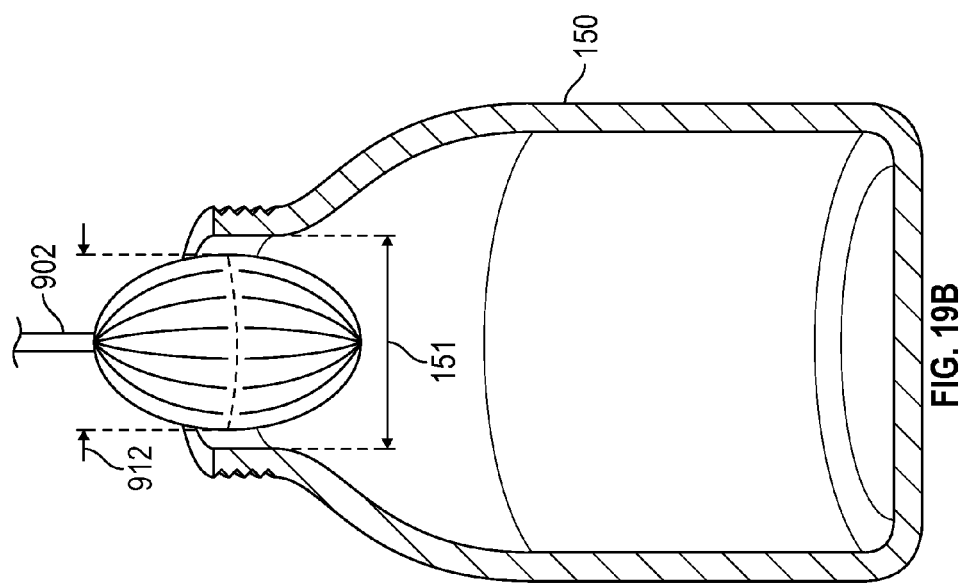

AGITATION ASSEMBLY

RELATED APPLICATIONS

This application claims priority to U.S. Provisional Patent Application Ser. No. 61/977,376, filed Apr. 9, 2014 and titled CONTAINER INSERTABLE AGITATION DEVICE, and to U.S. Provisional Patent Application Ser. No. 62/046,049, filed Sep. 4, 2014 and titled AGITATION ASSEMBLY, each of which is incorporated herein by reference, in its entirety.

TECHNICAL FIELD

The present invention relates to various whisks and other mixing devices. More particularly, the present invention relates to various mixing devices that are capable of being placed and tethered within a container, and which are capable of being agitated within the container to mix the contents of the container. A user may place an item, such as an agitator device into a container to thereby agitate the contents thereof by applying physical movement to the container.

BACKGROUND

A common problem when preparing powdered mixes, such as infant formula, is the clumping effect that often occurs when a liquid is added to the powder. Many containers on the market, such as baby bottles, water bottles, drinking containers, salad dressing containers, gravy containers, and the like do not have openings large enough to insert a standard agitating device, such as a standard kitchen whisk. Because of this, the user is often left with clumps which can be unpleasant in taste and can often obstruct the drinking nozzle. Other inventions have attempted to solve this problem by creating a separate container with a built-in blending device. The finalized mix is then poured into the appropriate container for drinking. However, this not only adds additional costs, but is an additional appliance that must be thoroughly cleansed after each use. Other inventions provide for internal agitators, but the agitator must remain in the liquid until emptied. The present invention addresses and solves these problems.

BRIEF SUMMARY OF THE INVENTION

The present application generally relates to systems and methods for mixing the contents of a container via an agitator device that is suspended within the interior of a container via one or more tethers. In some instances, the agitator device comprises a whisk-like structure having a plurality of mixing members or surfaces that are spaced to form voids or apertures between the mixing surfaces. As the contents of the container pass through the voids or apertures, the mixing surfaces act as physical barriers to create aberrant or turbulent currents through the contents to achieve a homogenous mixture.

The tether generally comprises a first end that is directly or indirectly coupled to a surface of the container, and further comprises a second end that is directly or indirectly coupled to the agitator device. Thus, the first end is generally immobilized and the second end moves freely with the agitation device within the interior of the container. In some instances the tether comprises a flexible or semi-flexible material having a fixed length. In some instances the tether comprises an elastic material, wherein the length of the tether may adjust due to stretching and recoil forces. In some instances the tether comprises a rigid material that is incapable of stretching or flexing.

As will be readily appreciated by one having ordinary skill in the art, the specific structures of the container, agitator device, and/or tether may vary greatly while still accomplishing the underlying principles of the present invention. Accordingly, the various representative embodiment shown in the figures and discussed herein are provided merely as non-limiting examples to illustrate various features and structures to aid the reader in understanding that which has been contemplated, and to generally define a scope of the present invention.

BRIEF DESCRIPTION OF THE DRAWINGS

FIGS. 19A-19D provide cross-section views demonstrating a collapsible agitation device, wherein the agitation device is temporarily collapsed to reduce the outer diameter of the agitation device, thereby permitting the agitation device to be inserted through an opening of the container, wherein the agitation device automatically expands within the container to reduce space between the agitation device and the inner surface of the container, the agitation device again temporarily collapsing upon removal of the agitation device through the opening of the container in accordance with a representative embodiment of the present invention.

DETAILED DESCRIPTION OF EXAMPLE EMBODIMENTS

Figure 1:
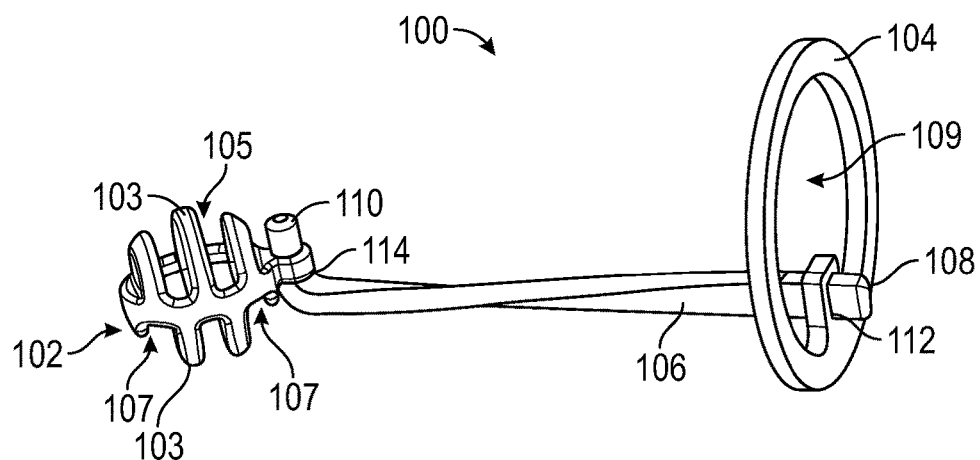
FIG. 1 is a perspective view of an agitation device removably coupled to a retainer ring via a tether in accordance with a representative embodiment of the present invention.

The following descriptions depict only example embodiments and are not to be considered limiting of its scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of any and all equivalents thereof. Moreover, many embodiments, such as adaptations, variations, modifications, and equivalent arrangements, will be implicitly disclosed by the embodiments described herein and fall within the scope of the present invention. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The present application generally relates to systems and methods for mixing the contents of a container via an agitator device that is suspended within the interior of a container via one or more tethers. As used herein, the term "suspended" means that an agitator device is located within the interior of a container and coupled thereto via one or more tethers, whether or not the agitator device is in contact with the sides, bottom, or other interior surface of the container. In some instances, the agitator device comprises a whisk-like structure having a plurality of mixing members or surfaces that are spaced to form voids or apertures between the mixing surfaces. As the contents of the container pass through the voids or apertures, the mixing surfaces act as physical barriers to create aberrant or turbulent currents through the contents to achieve a homogenous mixture.

The tether generally comprises a first end that is directly or indirectly coupled to a surface of the container, and further comprises a second end that is directly or indirectly coupled to the agitator device. Thus, the first end is generally immobilized and the second end moves freely with the agitation device within the interior of the container. In some instances the tether comprises a flexible or semi-flexible material having a fixed length. In some instances the tether comprises an elastic material, wherein the length of the tether may adjust due to stretching and recoil forces. In some instances the tether comprises a rigid material that is incapable of stretching or flexing.

As will be readily appreciated by one having ordinary skill in the art, the specific structures of the container, agitator device, and/or tether may vary greatly while still accomplishing the underlying principles of the present invention. Accordingly, the various representative embodiment shown in the figures and discussed herein are provided merely as non-limiting examples to illustrate various features and structures to aid the reader in understanding that which has been contemplated, and to generally define a scope of the present invention.

Referring now to FIG. 1, an agitation assembly 100 is shown. In some embodiments, agitator assembly 100 comprises an agitator device 102 comprising a spherical structure. Agitator device 102 comprises a plurality of mixing surface 103 forming an outer surface and surrounding a central void 105. The outer surface of agitator device 102 further comprises a plurality of wall spaces 107 through which liquid and powder may pass in order to aid in the mixing and formation of a refined suspension.

Agitator device 102 may comprise any material that is suitable for use within a designated container. For example, where a container is designated for storage and mixing of food products intended for human consumption, agitator device 102 may comprise any material that is suitable for contact with human food products. Similarly, where a container is designated for storage and mixing of one or more chemicals, agitator device 102 may comprise any material that is suitable for use and/or contact with the intended chemicals. In some instances, agitator device 102 comprises a material selected from the group consisting of metals, plastics, or any suitable material known to those with skill in the art that are safe for use with human consumption and that substantially retain their rigid or substantially rigid form on repeated impact. In other instances, agitator device 102 comprises a resilient polymer that is safe for use with human consumption and that recovers to its original form on repeated impact.

Agitator device 102 may comprise any shape that is compatible with the intended use of the agitator device. For example, in some embodiments agitator device 102 comprises a shape selected from the group consisting of spherical or substantially spherical, square, globe, spoon-shaped, flat, rectangular, square, rhombus, cylindrical, oblong, pyramidal, toroid, helical, round, hoop, and spiral. Agitator device 102 may further comprise one or more holes or pathways provided to encourage the contents of the container to pass therethrough as part of the mixing process. In some instances, agitator device 102 comprises a plurality of pathways.

Agitator device 102 generally comprises a maximum dimension that is less than an opening of the container intended to receive agitator device 102. However, some embodiments of the present invention include an agitator device comprising a material or structure that may be temporarily collapsed or otherwise altered to reduce a maximum dimension of the agitator to permit insertion within the container. A non-limiting embodiment illustrating this principle is shown and discussed in connection with FIGS. 19A-19D, below.

Agitation assembly 100 further comprises a retainer ring 104. In some embodiments, retainer ring 104 comprises a rigid material that interacts or couples with the container in a secure manner. In some instances retainer ring 104 comprises an outer shape that approximates an inner shape of the container to which it is secured. In some instances retainer ring 104 comprises a hollow center 109, whereby fluid within the container is permitted to freely travel through hollow center 109. In some instances retainer ring 104 further comprises a tether clip 112 configured to securely retain the first, or coupled end 108 of tether 106. In some embodiments, tether clip 112 is positioned within hollow center 109, as shown in FIG. 1. In other embodiments, tether clip 112 is formed in the ring portion of retainer ring 104, as will be shown. One having skill in the art will appreciate that the specific structure of tether clip 112 may vary greatly within the teachings of the instant invention.

Agitation assembly 100 further comprises a tether 106. Tether 106 is provided as a physical anchor between agitator device 102 and retainer ring 104. In some embodiments, tether 106 comprises a second end 110 that is coupled to agitator device 102, such as by an agitator mount 114 or other structure forming an accessible surface or feature of agitator device 102. In some embodiments, second end 110 is selectively coupled to agitator device 102, whereby agitator device 102 may be selectively removed from tether 106 for cleaning or replacement. In other instances, second end 110 is permanently coupled to agitator device 102. In some instance, tether 106 and agitator device 102 comprise a monolithic structure. Further, in some instances tether 106, agitator device 102, and retainer ring 104 comprise a monolithic structure.

In some embodiments, tether 106 comprises a flexible or semi-flexible material. In some embodiments, tether 106 comprises an elastic or elastomeric material, such as a silicone material, latex, polypropylene, or a natural rubber material. Tether 106 generally anchors agitator device 102 to the container while permitting free movement of agitator device 102 within the interior of the container. Thus, the particular material and structural design of tether 106 may impact the movement of agitator device 102 within the container.

The specific means by which first end 108 of tether 106 is coupled to retainer ring 104 may vary. In some embodiments, first end 108 comprises a protrusion or may otherwise be widened to fit through an aperture 112 of retainer ring 104, wherein the interaction between first end 108 and aperture 112 is maintained via frictional and/or mechanical force. This same type of interaction may be implemented between second end 110 and agitator mount 114.

Figure 3:
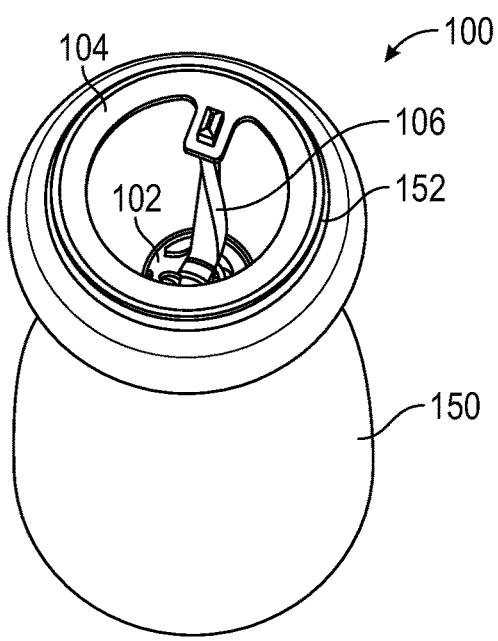
FIG. 3 is a top side perspective view of a container fitted with the agitation device, retainer ring, and tether of FIG. 1 in accordance with a representative embodiment of the present invention.

Referring now to FIGS. 1 and 3, in some instances retainer ring 104 comprises an outer diameter that is configured to compatibly seat within an opening 152 of container 150. In some instances, opening 152 comprises a ledge or other surface that is designed to interact with retainer ring 104 to maintain the position of retainer ring 104 near the rim or opening 152 of container 150, i.e. to prevent retainer ring 104 from being displaced into the interior of the container. For example, in some instances container 150 comprises an annular groove or channel into which retainer ring 104 is seated.

Following insertion of agitation assembly 100 into the interior of container 150, a cap 160 (see FIG. 5) is threadedly secured to opening 150. In some instances, retainer ring 104 is countersunk below opening 150, so as to not interfere with the placement of cap 160. Once secured, container 150 is shaken to cause agitator device 102 to travel throughout the interior of container 150. Once a desired consistency or mixing is achieved for the contents of container 150, hollow center 109 permits distribution of the contents without requiring the removal of agitator assembly 100 from container 150. In some instances, the inner diameter of hollow center 109 is less than the maximum outer diameter of agitator device 102, whereby the small diameter of hollow center 109 prevents agitator device 102 from passing through hollow center 109. In other instances, hollow interior 109 comprises other features to prevents passage of agitator device 102.

Figure 2:
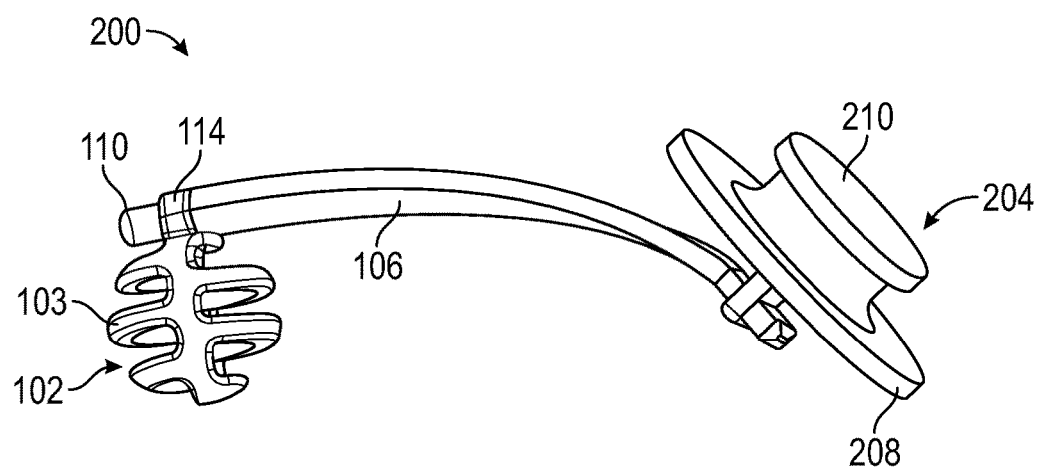
FIG. 2 is a perspective view of an agitation device removably coupled to a lid via a tether in accordance with a representative embodiment of the present invention.
Figure 4:
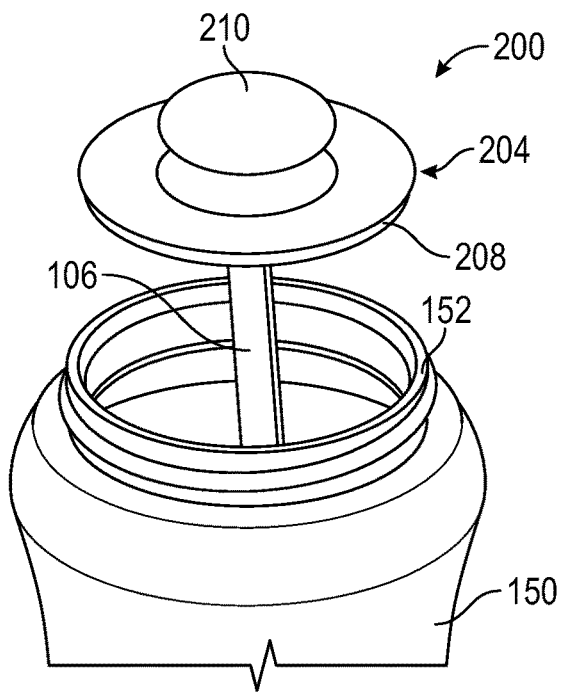
FIG. 4 is a top side perspective view of a container and the agitation device, lid and tether of FIG. 2 being partially inserted within the container in accordance with a representative embodiment of the present invention.

Referring now to FIGS. 2 and 4, agitator assembly 200 is shown. In some instances, agitator assembly 200 comprises a lid 204. Lid 204 comprises a solid base 208 having a diameter configured to cover and temporarily seal opening 152 of container 150 into which agitator device 102 and tether 106 are inserted. Upon insertion of agitator device 102 and tether 106 into a container 150, solid base 208 is set over opening 152 of container 150 and secured by applying constant downward pressure on handle 210, whereby solid base 208 forms a seal over opening 152 to prevent spillage during mixing. In some instances, lid 204 is held in place by threadedly securing cap 160 to container 150. The solid configuration of lid 204 prevents the contents of container 150 from contacting cap 160. This feature may be beneficial where cap 160 includes a baby nipple or other feature that may become clogged with liquids and/or powders being mixed therein. In some instance, at least a portion of the undersurface of solid base 208 comprises a material or coating that readily forms a sealed surface against opening 152 of container 150, such as a silicone or latex coating. In some instances, the undersurface is tapered to provide a tapered fit between solid base 208 and opening 152. Further, in some instances solid base 208 is coupled to opening 152 via a threaded connection.

Agitator device 102 travels throughout the interior of container 150 as container 150 is shaken, and while maintaining a sealed surface between lid 204 and opening 152. Once a desired consistency or mixing of the contents within container 150 is achieved, agitator assembly 200 is removed from container 150 and a suitable cap 160 is applied to opening 152.

Figure 5:
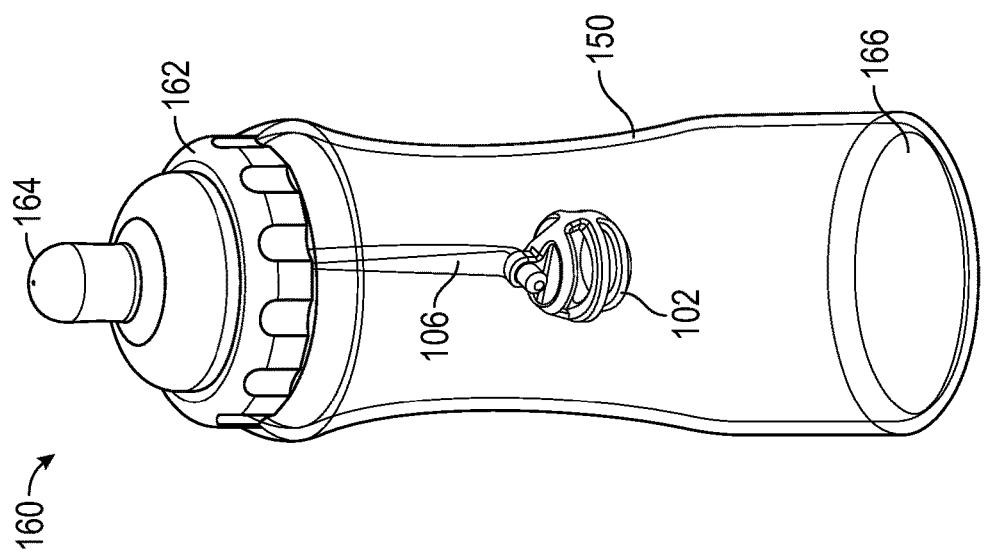
FIG. 5 is a perspective view of a container having a cap threadedly coupled thereto and supporting a nipple, an agitation device further being suspended within the container in accordance with a representative embodiment of the present invention.

Referring now to FIG. 5, a non-limiting example of an agitation assembly is shown secured within the interior of a container 150. Container 150 may comprise any type of container configured to hold ingredients or components that are intended to be mixed via agitation or shaking of the container. Non-limiting examples include a baby bottle, a water bottle, a drinking container, a salad dressing container, a gravy container, a juice carafe, a paint container, a lubricant container, and the like.

In some embodiments, container 150 comprises a baby bottle, wherein container 150 comprises the base of the baby bottle, and cap 160 comprises a nipple ring 162 fitted with a baby nipple 164, as shown. In some instances, tether 106 comprises a length that is less than the height of container 150, wherein agitator device 102 is suspended within the interior of container 150 and does not contact the base 166 of container 150. Where tether 106 comprises an elastic material, agitator device 102 may move throughout the interior of container 150 and may contact base 166 as container 150 is shaken. In some instances, tether 106 comprises a length that prevents contact between base 166 and agitator device 102 during shaking. In other instances, tether 106 comprises at least one of a length, a flexibility, or an elastic capability that permits agitator device travel to all points within the interior of container 150 during shaking.

Figure 6:
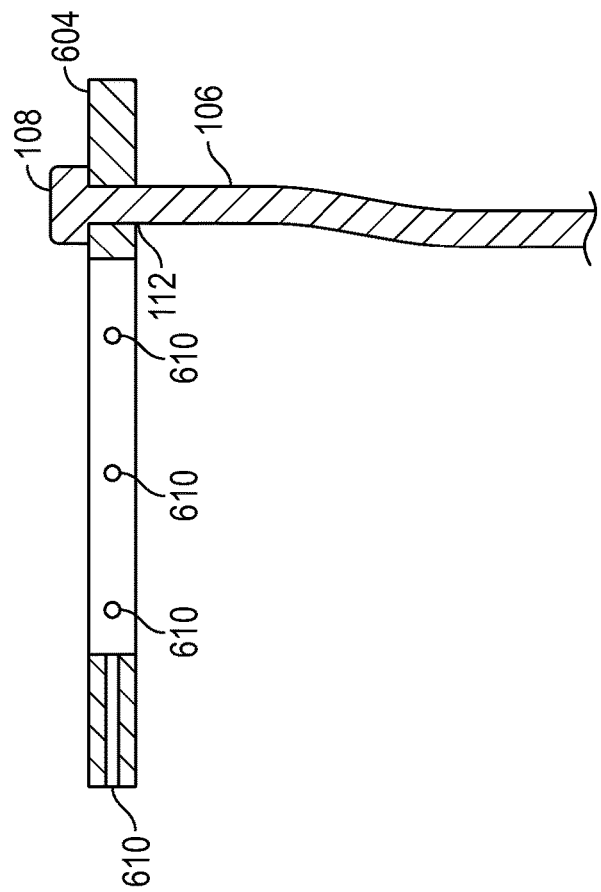
FIG. 6 is a cross-section side view of a retainer ring comprising a plurality of vent holes in accordance with a representative embodiment of the present invention.

Referring now to FIG. 6, a cross-section of retainer ring 604 and tether 106 is shown. In some instances, retainer ring 104 comprises a flexible or semi-flexible material that is capable of forming a seal between cap 160 and container 150. Thus, retainer ring 604 may be configured to overlap a portion of opening 152. Retainer ring 604 may alternatively be configured to insert within cap 160, wherein retainer ring 604 is interposed between cap 160 and the rim portion of opening 152 when cap 160 is threadedly secured to container 150.

In some embodiments, an agitation device is provided comprising a compression band that is attached to the first end of the tether and forms a loop or circular band for securement to the outer surface of the container. In some embodiments, the compression band is secured around or over a portion of the container threads such that a portion of the tether is located outside of the container and the remainder of the tether and agitation device is positioned within the container. The elastic properties of the compression band secure the compression band to the outer surface via constrictive forces. The portion of the tether located outside of the container is trapped or interposed between the threads of the container and complementary threads on the cap of the container, wherein the threaded connection between the container and the cap fixes the position of the first end of the tether. In some embodiments, the elastic and/or conformable properties of the tether mold to the threaded interface and do not disrupt the connection between the container and the cap.

In order to avoid the buildup of vacuum pressures within container 150, in some instances retainer ring 604 comprises one or more air vents 610 formed through the sidewall of retainer ring 604. Air vents 610 provide fluid communication between the interior of container 150 and the threads of cap 160 when cap 160 is secured to container 150. In some instances, air vents comprise a cross-sectional diameter sufficient to maintain a passageway for air when retainer ring 604 is compressed by tightening cap 160 onto container 150. Retainer ring 604 may further comprise an aperture 112 formed through the ring portion of retainer ring 604, wherein the orientation of air vents 610 is perpendicular to the orientation of aperture 112.

Figure 7A:
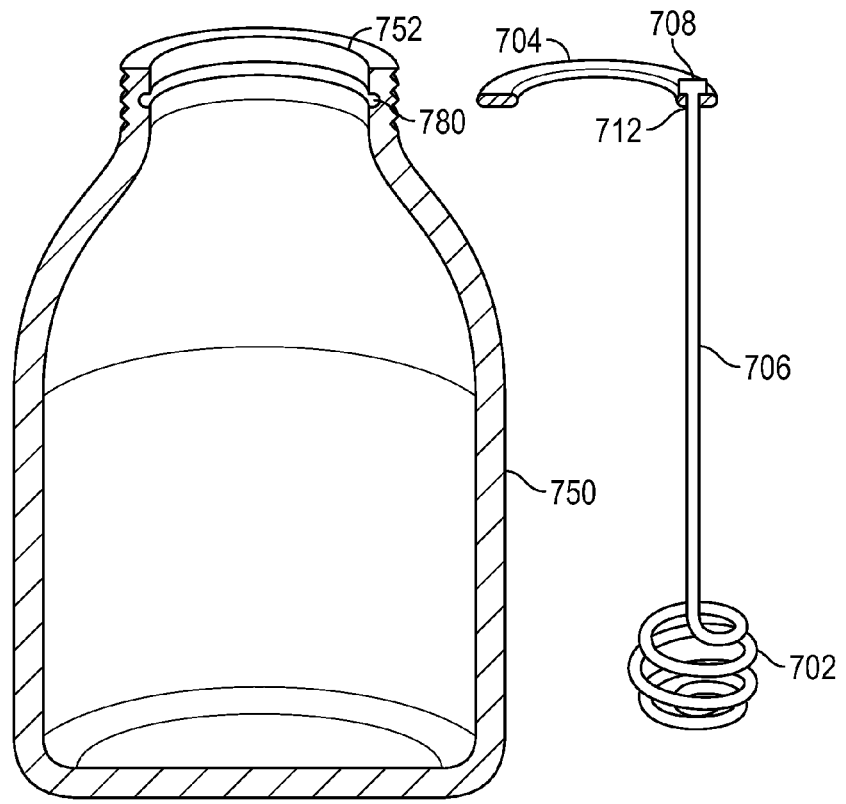
FIG. 7A shows a cross-section view of a container having an annular channel for receiving and retaining a retainer ring, wherein the retainer ring comprises one or more features for receiving and retaining an end portion of a tether in accordance with a representative embodiment of the present invention.

Referring now to FIG. 7A, a container 750 is shown having an annular groove 780 configured to securely and selectively receive retainer ring 704 via mechanical interference. In some instances, retainer ring 704 comprises a maximum outer diameter that is approximately equal to the inner diameter of annular groove 780, wherein retainer ring 704 is slightly compressed when inserted through opening 752 until fitted into annular groove 780. Upon being seated in annular groove 780, the resilient nature of retainer ring 704 restores its original shape, thereby securely fitting within annular groove 780.

In some embodiments, retainer ring 704 comprises an aperture 712 that is configured to selectively receive and support first end 708 of tether 706. In some instances, tether 706 and agitator device 702 comprise a monolithic structure, wherein tether 706 and agitator device 702 comprise a single material. In other instances, tether 706 and agitator device 702 comprise a monolithic structure, wherein tether 706 comprises a first material and agitator device 702 comprises a second material, tether 706 and agitator device 702 being fused or otherwise permanently or selectively connected via one or more known techniques, such as by mechanical fastening, fusion bonding, hot gas welding, vibration welding, solvent welding, ultrasonic welding, induction welding, and/or dielectric welding.

Figures 7B, 7C:
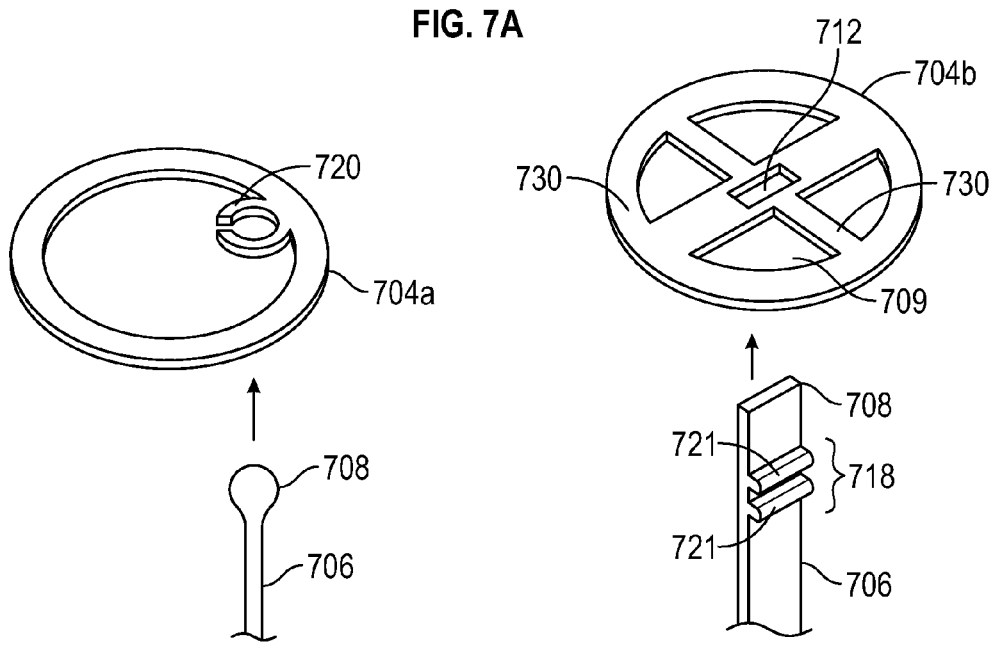
FIGS. 7B-7C show perspective views of various retainer rings and tethers in accordance with various representative embodiments of the present invention.

Referring now to FIGS. 7B and 7C, retainer ring 704 may comprise various configurations within the spirit of the present invention. Further, the method by with tether 706 attaches to retainer ring 704 may comprise various configurations. With reference to FIG. 7B, in some embodiments retainer ring 704a comprises a tether clip 720 forming a c-shaped channel having an opening through which tether 706 is inserted. First end 708 comprises an outer diameter that is greater than the inner diameter of the c-shaped channel. As such, first end 708 is prevented from being pulled through the c-shaped channel. In other instances, retainer ring 704b comprises cross-members 730 which reduce the surface area of the hollow center 709. Cross-members 730 generally comprise a thickness that is equal to the thickness of the remainder of retainer ring 704b. In some instances, cross-members 730 comprise a width that is equal to the remainder of retainer ring 704b. In other instances, cross-members 730 comprise a width that is greater than, or less than the remainder of retainer ring 704b. Further, in some instances retainer ring 704b comprises two or more cross-members 730, wherein one of the cross-members 730 comprises a first width and another of the cross-members 730 comprises a second width that is greater than, or less than the first width.

Cross-members 730 provide additional mixing surfaces that may aid in mixing the contents of container 750 as the contents move through the various subsections of hollow center 709. The reduced surface areas of hollow center 709 further prevent agitator device 702 from passing through retainer ring 704b. This feature may be useful for embodiments in which container 750 comprises a cap having a nipple or other feature into which agitator device 702 may become trapped during shaking of container 750.

In some embodiments, one or more of cross-members 730 further comprises an aperture 712 for selectively receiving first end 708 of tether 706. The location of aperture 712 may be centered within hollow center 709, as shown, or may be off-centered at any position along cross-members 730. In some embodiments, aperture 712 comprises a cross-sectional shape that is approximately equal to a cross-sectional shape of tether 706. As such, aperture 712 provides a keyed fit for tether 706. In some instances, first end 708 comprises a tether lock 718 that is configured to interact with aperture 712 to selectively retain first end 708 therein. In some embodiments, tether lock 718 comprises a pair of rib protrusions 721 which increase the thickness of tether 706 to be greater than aperture 712. Rib protrusions 721 are spaced apart a distance that is approximately equal to the thickness of cross-member 730 at aperture 712. As first end 708 is drawn through aperture 712, the foremost rib protrusion 721 contacts aperture 712 and is temporarily deformed in order to permit the rib protrusion to pass through aperture 712. Upon clearing aperture 712, the foremost rib protrusion is restored to its original dimensions, wherein cross-member 730 is positioned between the two rib protrusions 721. Generally, the force required to temporarily deform rib protrusion 721 is greater than the forces experienced by tether 706 during agitation or shaking of container 750. Tether 706 is removed from aperture 712 by reversing the process.

Figure 7D:
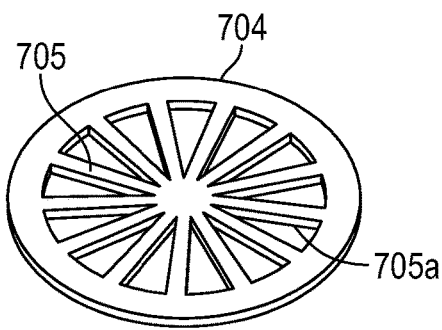
FIG. 7D shows a top view of a retainer ring having a plurality of whisking elements in accordance with a representative embodiment of the present invention.
Figure 7E:
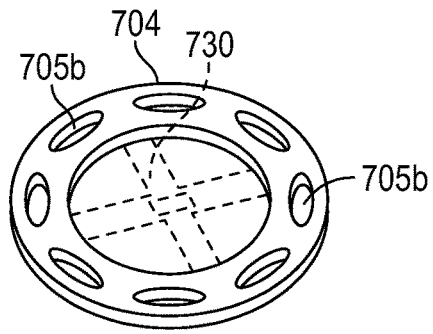
FIG. 7E shows a top perspective view of a retainer ring having a plurality of whisking elements in accordance with a representative embodiment of the present invention.

Some embodiments of the present invention further comprise a retainer ring having one or more whisking elements or features, as shown in FIGS. 7D-7G. In some embodiments, retainer ring 704 comprises a plurality of whisking features 705. Whisking features 705 may comprise any shape or configuration in accordance with the present invention. In one embodiment, retainer ring 704 comprises a plurality of whisking features 705a which extend radially outward from the center of retainer ring 704 and are attached to an outer ring or surface of retainer ring 704, as shown in FIG. 7D. In one embodiment, retainer ring 704 includes a plurality of whisking features 705b comprising a plurality of holes formed through the outer ring of retainer ring 704, as shown in FIG. 7E. In some instances, retainer ring 704 further comprises cross-members 730, as discussed above.

Figure 7F:
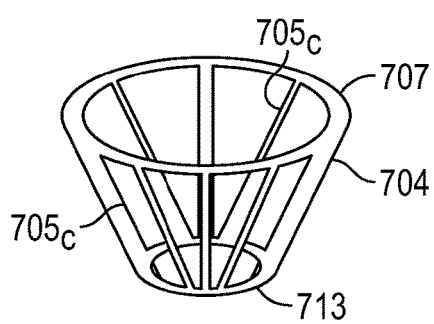
FIG. 7F shows a perspective view of a retainer ring comprising a whisk structure in accordance with a representative embodiment of the present invention.

In one embodiment, retainer ring 704 comprises a plurality of whisking members 705*c* forming a whisk structure, as shown in FIG. 7F. Retainer ring 704 comprises a top ring 707 and bottom ring 713 which are interconnected via the plurality of whisking members 705*c*. In some instances, whisking members 705*c* are generally aligned in a vertical orientation and extend between top ring 707 and bottom ring 713 in a radial pattern. In some instances, whisking members 705*c* further comprise one or more horizontal members.

In one embodiment, top ring 707 comprises an outer diameter is selected to attach or otherwise couple to container 750. In one embodiment, bottom ring 713 comprises an inner diameter selected to receive and retain a first end 708 of tether 706. In one embodiment, the inner diameter of bottom ring 713 is smaller than the outer diameter of top ring 707. Top ring 707 or bottom ring 713 may further comprise one or more tether clips (not shown) in accordance with the present invention.

Figure 7G:
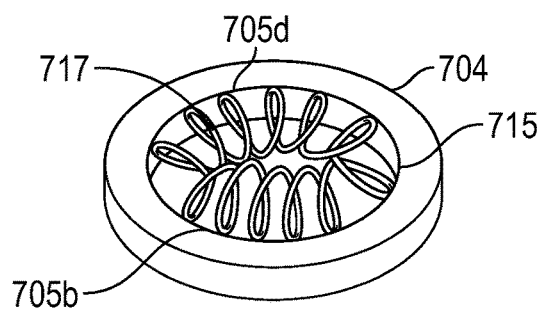
FIG. 7G shows a perspective top view of a retainer ring comprising a whisking element in accordance with a representative embodiment of the present invention.

Referring now to FIG. 7G, retainer ring 704 may further comprise a whisking element 705*d* attached to one or more surfaces of retainer ring 704. Whisking element 705*d* may comprise any structure or configuration in accordance with the present invention. In one embodiment, whisking element 705*d* comprises a helical whisking element that is attached to the inner surface 715 of retainer ring 704. In one embodiment, whisking element 705*d* is threaded through a plurality of holes formed through retainer ring 704. In some instances, whisking element 705*d* is positioned such that a hollow center 717 is provided through retainer ring 704. In some embodiments, whisking element 705*d* is positioned and configured such that whisking element 705 fills hollow center 717 of retainer ring 704.

Figure 7H:
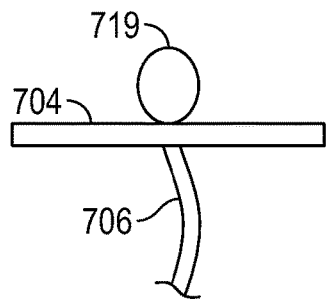
FIGS. 7H and 7I show side plan views of a retainer ring having a tab to assist in grasping the retainer ring in accordance with a representative embodiment of the present invention.
Figure 7I:
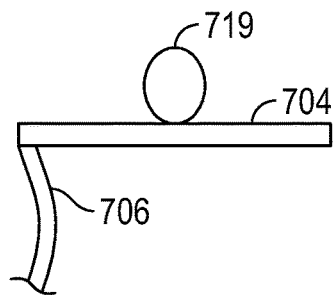

Some retainer rings of the present invention further include a tab 719 to assist in placing and removing retainer ring 704 within a container. Tab 719 is generally located at the center of retainer ring 704, but may be positioned at any location thereon. In some embodiments, tab 719 comprises a portion of tether 706 that overextends through retainer ring 704, as shown in FIG. 7H. In some instances, tab 719 is directly coupled to, or forms a part of retainer ring 704, as shown in FIG. 7I.

Figure 8:
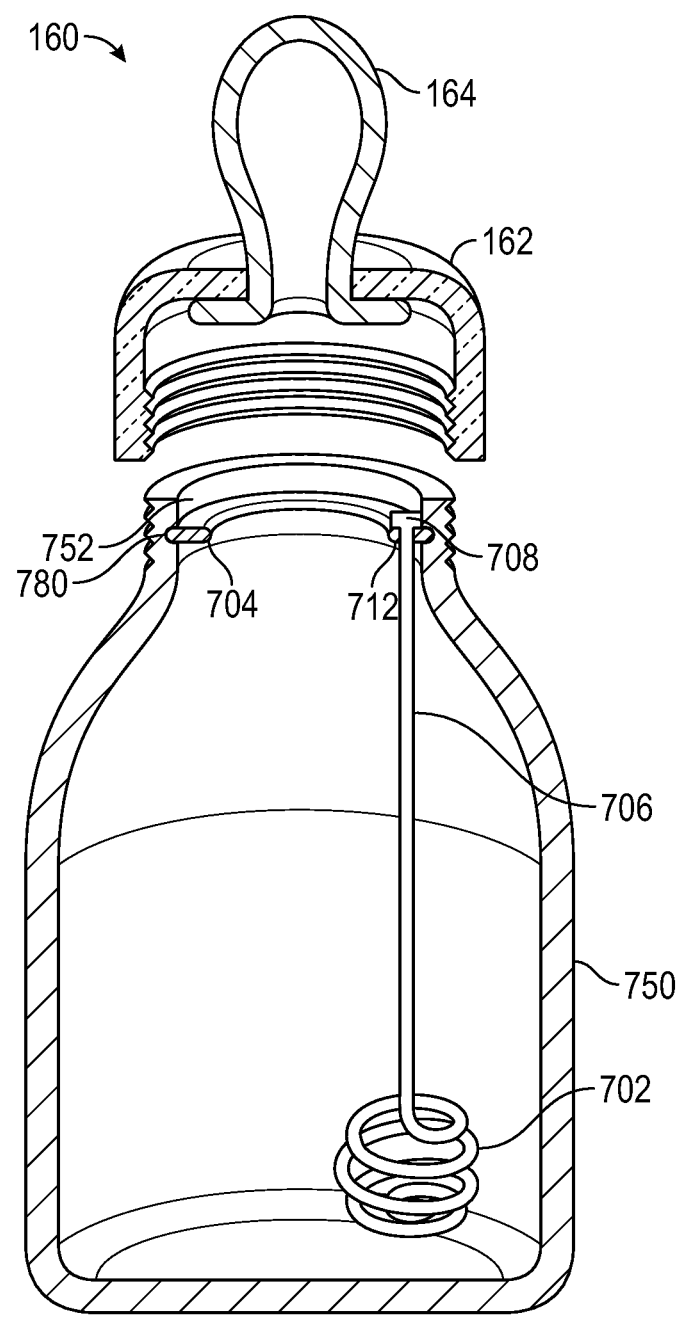
FIG. 8 is a cross-section view of the container and retainer ring of FIG. 7A, wherein the retainer ring and the integrated tether and agitation device are coupled to the interior of the container via an annular channel formed on the inner surface of the container in accordance with a representative embodiment of the present invention.

The position of annular groove 780 within opening 752 of container 750 is generally selected to prevent interference between retainer ring 704 and cap 162. Accordingly, in some embodiments annular groove 780 is countersunk within opening 752 such that first end 708 is positioned below the rim of opening 752, as shown in FIG. 8.

Figure 9:
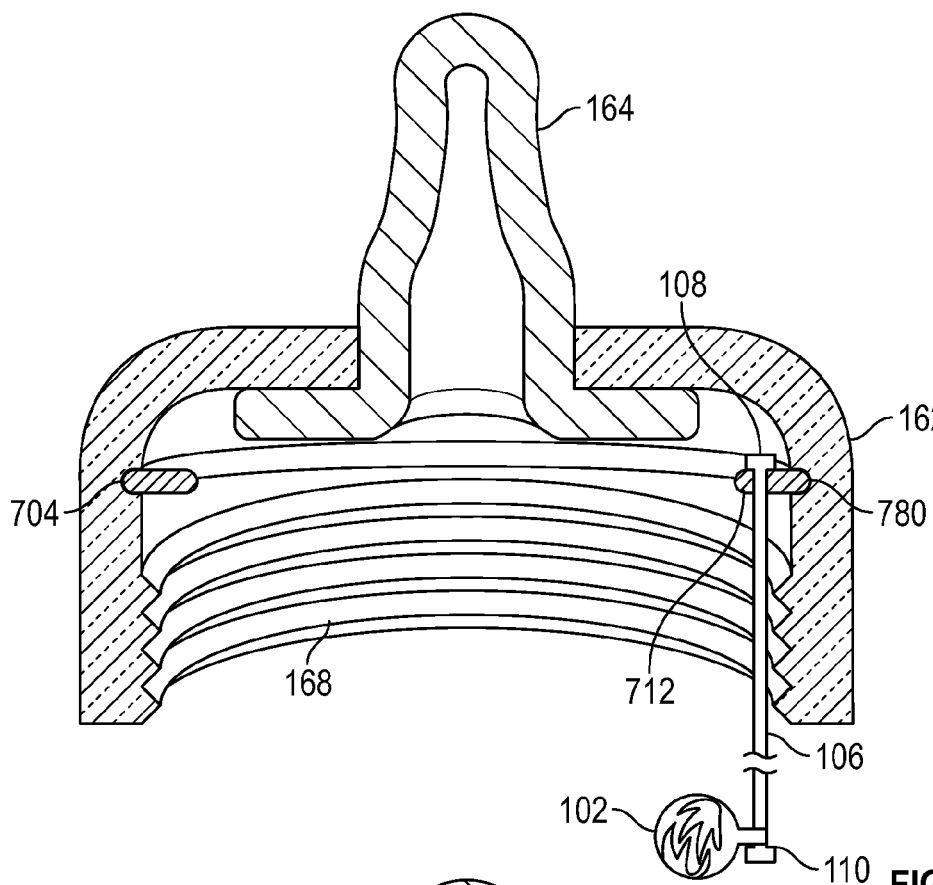
FIG. 9 is a cross-section view of a retainer ring coupled to the inner surface of a container cap via an annular channel formed on the inner surface of the container cap, wherein the retainer ring is coupled to an agitation device via a tether in accordance with a representative embodiment of the present invention.

In other instances, annular groove 780 is located within cap 162 at a positioned interposed between the nipple 164 and threads 168, as shown in FIG. 9. As positioned, retainer ring 704 does not interfere with the threaded connection between cap 162 and the container. In some instances, the position of retainer ring 704 further maintains the placement of nipple 164.

Figure 10:
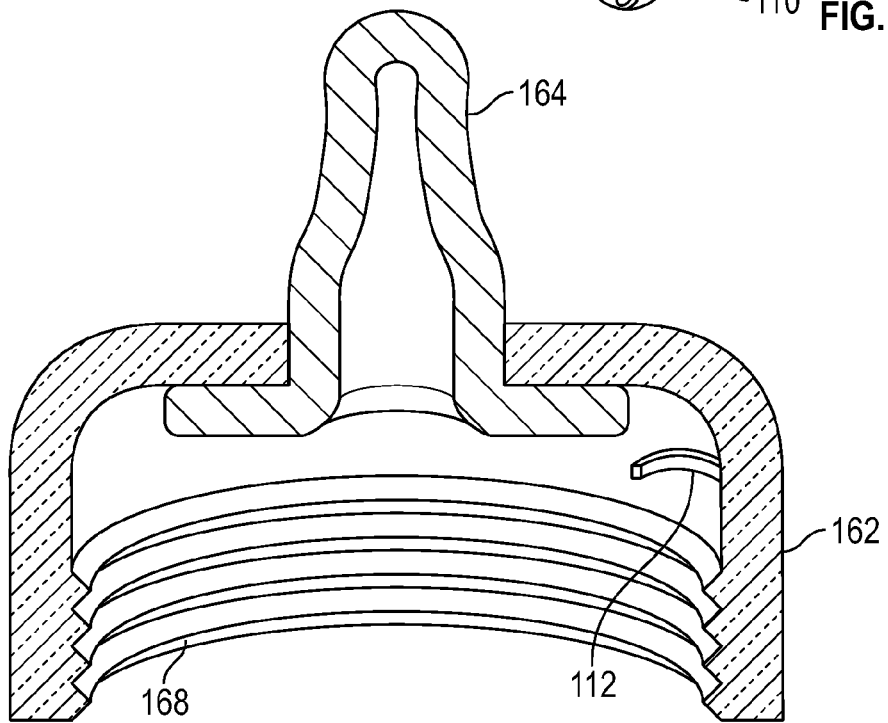
FIG. 10 is a cross-section view of a container cap comprising a tether clip on the inner surface of the container cap in accordance with a representative embodiment of the present invention.
Figure 11A:
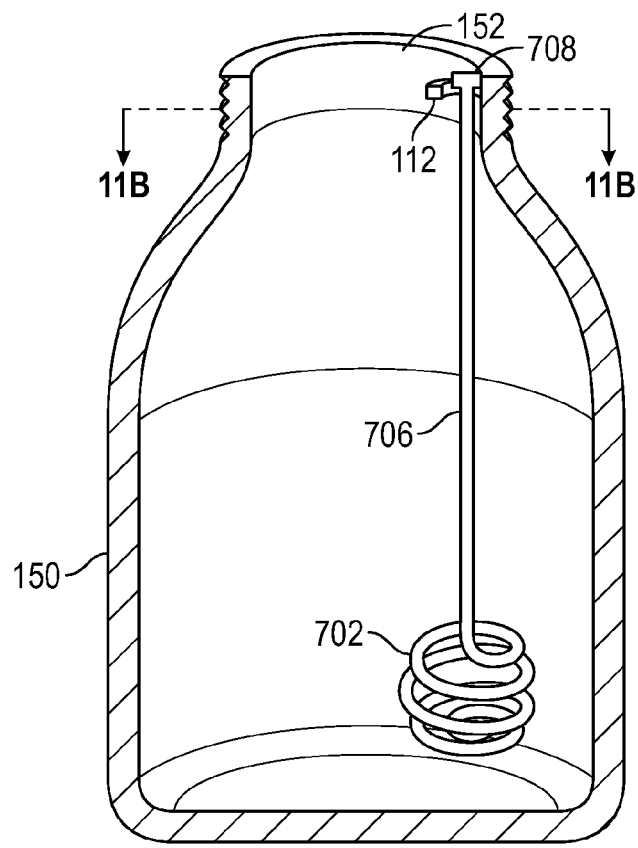
FIG. 11A is cross-section side view of a container comprising a tether clip on the inner surface of the container in accordance with a representative embodiment of the present invention.
Figure 11B:
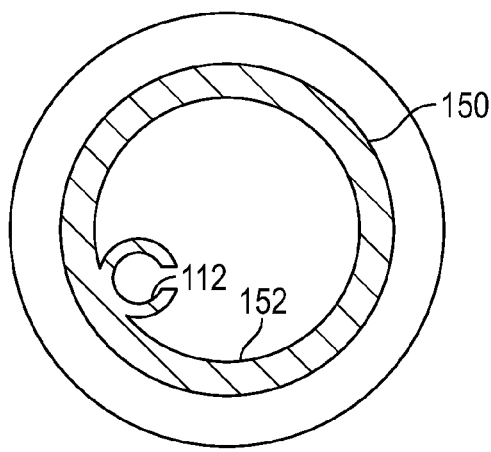
FIG. 11B is a cross-section top view of the container and tether clip of FIG. 11A in accordance with a representative embodiment of the present invention.

The underlying inventive concept of the present invention may be accomplished without the use of a retainer ring. For example, in some embodiments the inner surface of cap 162 comprises a tether clip 112 configured to receive and selectively retain the first end 108 of tether 106, as previously discussed, and as shown in FIG. 10. In other embodiments, an inner surface of container 150, such as neck portion 155, comprises a tether clip 112, as shown in FIGS. 11A and 11B. Thus, tether 706 may be anchored directly to one or more surfaces of container 150 and/or cap 162 via a tether clip 112 or other equivalent structure or feature.

Figure 11C:
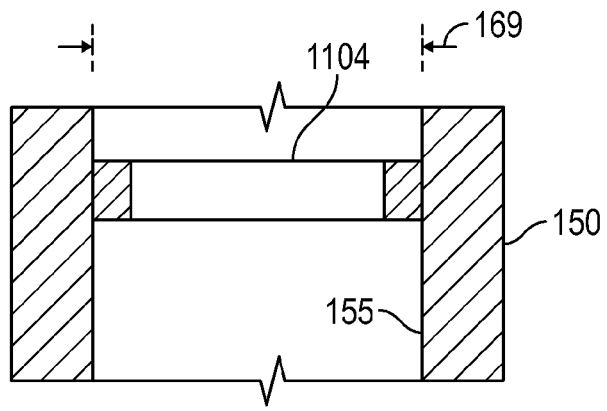
FIG. 11C is a cross-section side view of a neck portion of a container having retainer ring secured therein by an interference fit in accordance with a representative embodiment of the present invention.
Figure 11D:
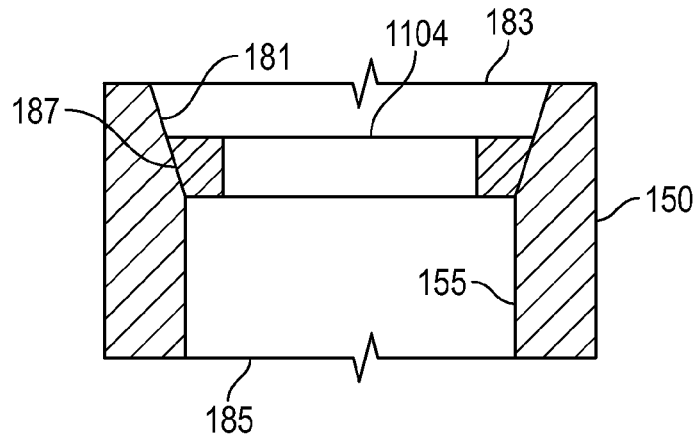
FIG. 11D is a cross-section side view of a neck portion of a container having tapered inner surface and further comprising a retainer ring secured within the neck portion by a tapered fit in accordance with a representative embodiment of the present invention.
Figure 11E:
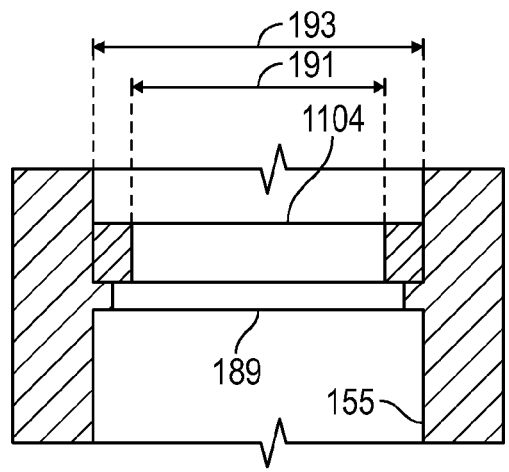
FIG. 11E is a cross-section side view of a neck portion of a container having an annular ledge surface for supporting a retainer ring in accordance with a representative embodiment of the present invention.

Referring now to FIGS. 11C-11E, neck portion 155 of container 150 may further comprise one or more features that support or otherwise permit placement of retainer ring 1104. In some embodiments, neck portion 155 comprises an inner diameter 169 that is approximately equal to, or slightly smaller than an outer diameter of retainer ring 1104, whereby retainer ring 1104 is secured within neck portion 155 via an interference fit. In some embodiment, the inner surface of neck portion 155 comprises a textured interface that increases friction between neck portion 155 and the outer surface of retainer ring 1104. For example, in some embodiments the inner surface of neck portion 155 comprises etching which increases the coefficient of friction for the inner surface of neck portion 155, thereby increasing the dry or static friction between retainer ring 1104 and neck portion 155. In some instances, the outer surface of retainer ring 1104 further comprises etching.

In one embodiment, at least one of the inner surface of neck portion 155 and the outer surface of retainer ring 1104 further comprises a high friction material. High friction materials may include any material or combination of materials that increase the coefficient of friction between neck portion 155 and retainer ring 1104. Non-limiting examples of high friction materials include silicone rubber, silicone elastomer, gum rubber, sandpaper, abrasives, acrylonitrile-butadiene rubber, polyacrylate rubber, natural rubber, adhesives, hydrogels, and absorbent polymers. In some instances, the high friction material is permanently coupled to one or more of the aforementioned surfaces. In other instances, the high friction material is removably or interchangeably coupled to one or more of the aforementioned surfaces.

In one embodiment, retainer ring 1104 is configured to expand within neck portion 155 and remain therein by interference fit. For example, in one embodiment retainer ring 1104 comprises a resilient polymer material that may be temporarily compressed during insertion into neck portion 155. Once seated within neck portion 155, the resilient polymer material expands, thereby wedging retainer ring 1104 against the inner surface of neck portion 155. In one embodiment, retainer ring 1104 comprises a plurality of interconnected pieces that may be mechanically expanded to form an interference fit within neck portion 155. Further still, in one embodiment retainer ring 1104 comprises a water-swellable polymer material, wherein upon exposure to moisture, retainer ring 1104 swells and expands to form an interference fit within neck portion 155.

Referring now to FIG. 11D, in some embodiments neck portion 155 comprises an inwardly tapered, inner surface 181. Tapered surface 181 is configured to provide a proximal opening 183 having a diameter that is wider or greater than a distal diameter 185 of container 150. Retainer ring 1104 further comprises a tapered outer surface 187 having a taper angle that is approximately equal to the taper angle of tapered surface 181. Tapered outer surface 187 further comprises a maximum outer diameter that is greater than distal diameter 185, such that retainer ring 1104 is prevented from bypassing tapered surface 181 and passing into the portion of container 150 having distal diameter 185. In some instances, the tapered interface between tapered surface 181 and tapered outer surface 187 provides an interference fit between container 150 and retainer ring 1104. In some instances, the interference fit between container 150 and retainer ring 1104 is increased as retainer ring 1104 is inserted downwardly within container 150 towards the portion of container 150 having distal diameter 185.

Referring now to FIG. 11E, in some embodiments neck portion 155 comprises an annular ledge 189 which protrudes inwardly into the interior of container 150. Annular ledge 189 comprises an inner diameter 191 that is smaller or less than the outer diameter 193 of retainer ring 1104. As such, retainer ring 1104 is retained within neck portion 155 and is prevented from bypassing annular ledge 189. In some instances, annular ledge 189 comprises a portion of container 150. In some instances, annular ledge 189 comprises a separate component that is affixed to the inner surface of neck portion 155. Annular ledge 189 may comprise a monolithic structure or may comprise a plurality of components or parts that are configured or arranged to provide a singular support surface. In some instances, annular ledge 189 is removable from container 150. In some instances, annular ledge 189 is permanently coupled to container 150. In some instances, annular ledge 189 is an integral part of container 150.

Figure 12A:
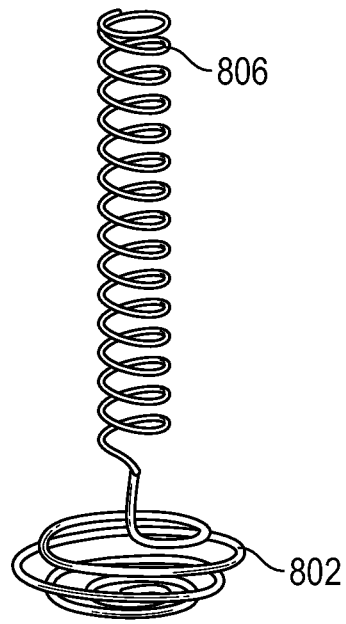
FIG. 12A is a perspective view of a monolithic tether and agitation device in accordance with a representative embodiment of the present invention.
Figure 12B:
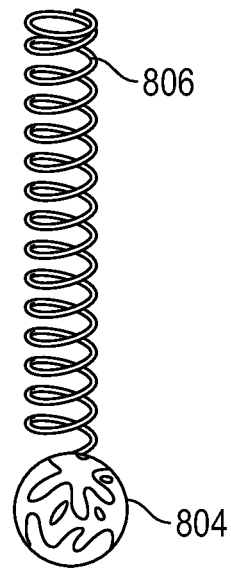
FIGS. 12B and 12C provide perspective views of tethers and agitation devices, wherein the tether comprises one or more structures or features that provide an agitating or mixing function in accordance with a representative embodiment of the present invention.

In some instances, a tether comprises one or more agitating elements to assist in the mixing process. For example, in some embodiments tether 806 comprises a helical shape which provides tether 806 with flexibility and the ability to extend and retract during agitation or shaking of container 150, as shown in FIGS. 12A and 12B. The helical shape further provides additional mixing surfaces that may contact and mix the contents of container 150 when shaken. In some instances, tether 806 and agitator device 802 comprise a monolithic structure, as shown in FIG. 12A. In other instances, tether 806 is coupled to agitation device 804 via one or more know methods, as discussed previously and as shown in FIG. 12B.

Figure 12C:
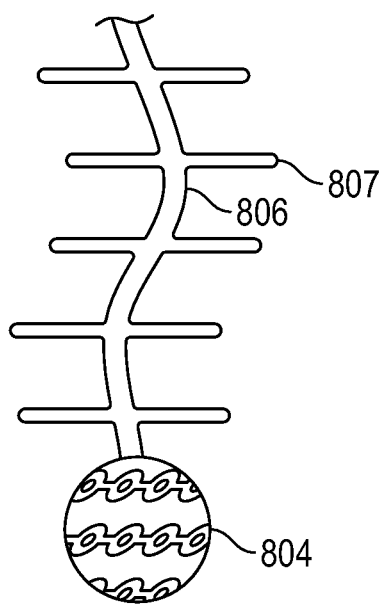

In some embodiments, tether 806 further comprises one or more mixing surfaces 807 which extend outwardly from tether 806, as shown in FIG. 12C. The one or more mixing surfaces 807 may comprise any shape or configuration within the spirit of the instant invention. Mixing surfaces 807 increase the surface area of tether 806 thereby increasing contacts between tether 806 and the contents of the container. In some embodiments, mixing surfaces 807 comprise the same material as tether 806. In other embodiments, mixing surfaces 807 comprises a first material, and tether 806 comprises a second material. In some instances, mixing surfaces 807 are flexible or semi-flexible. In other instances, mixing surfaces 807 are rigid or semi-rigid.

Figure 13:
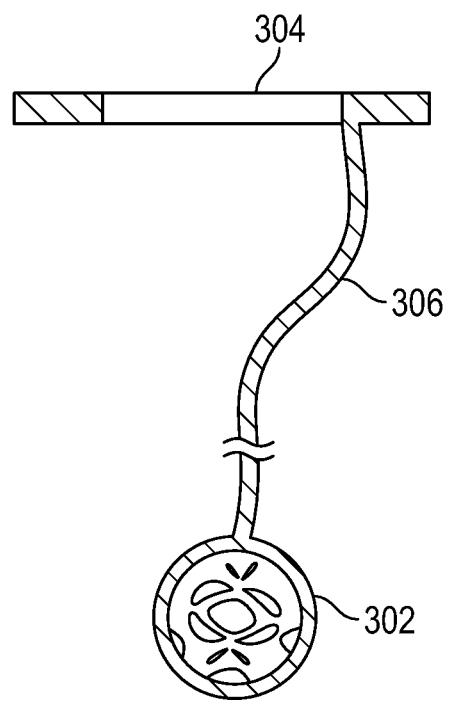
FIG. 13 is a cross-section view of a retainer ring, tether and agitation device forming a monolithic structure in accordance with a representative embodiment of the present invention.

In some embodiments, retainer ring 304, tether 306 and agitator device 302 form a monolithic device, as shown in FIG. 13. As with various previous embodiments, retainer ring 304, tether 306 and agitator device 302 may be comprised of the same material, or may be comprised of two or more materials that have been joined or otherwise combined to provide a monolithic structure.

Figure 14:
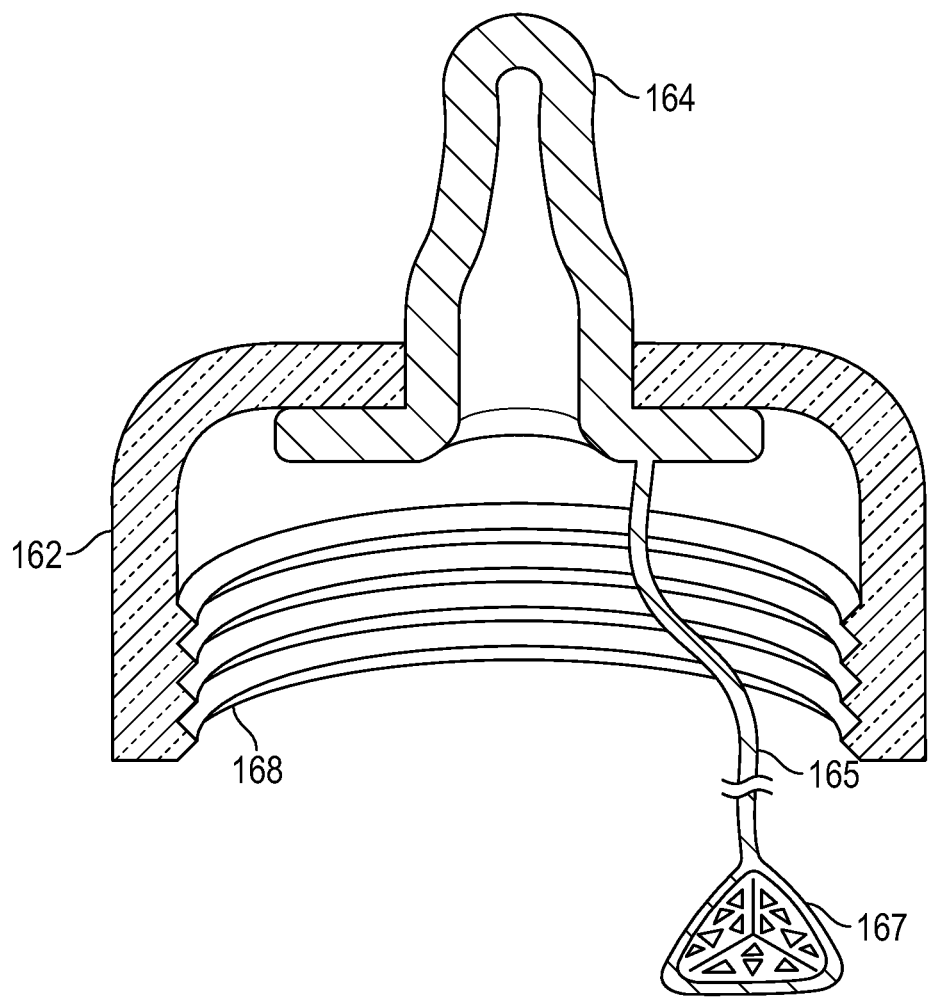
FIG. 14 is a cross-section view of a nipple, tether and agitation device forming a monolithic structure, wherein the nipple is configured to compatible insert with a container cap in accordance with a representative embodiment of the present invention.
Figure 15:
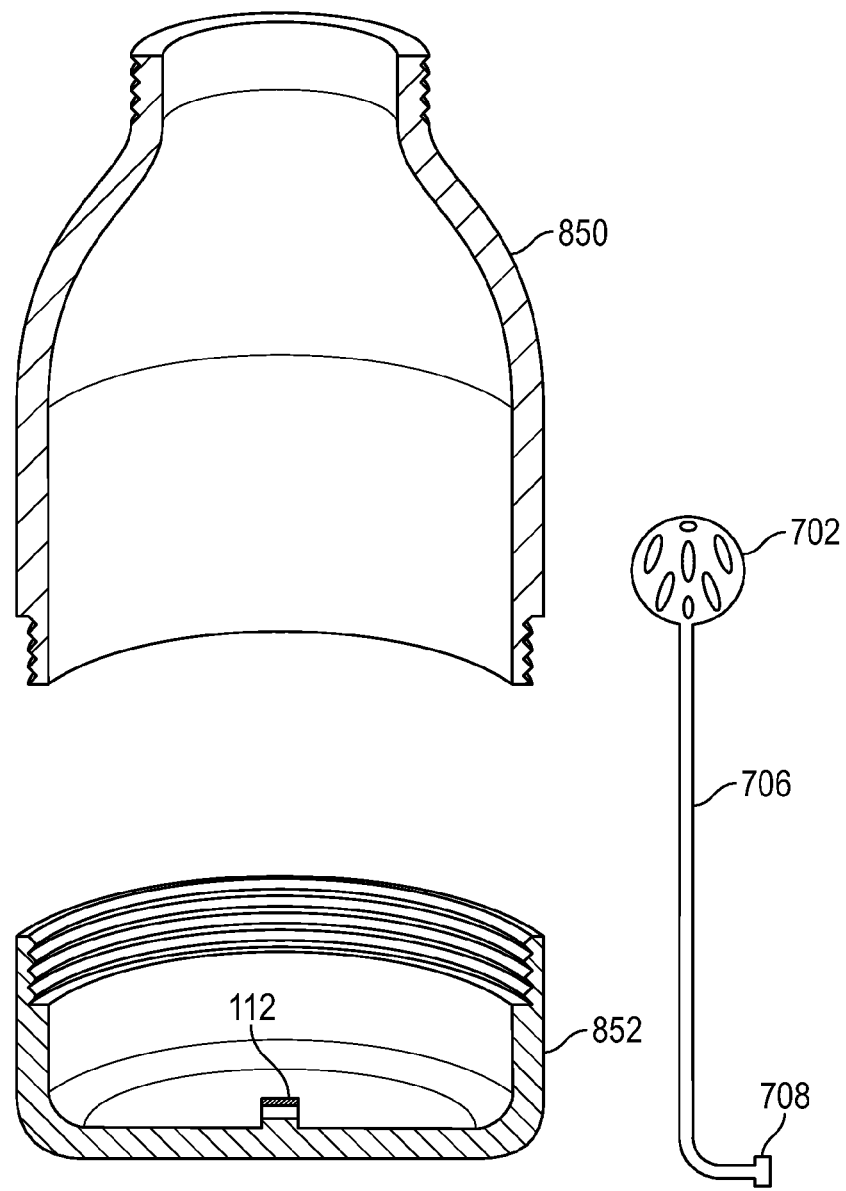
FIG. 15 is a cross-section, exploded view of a container having a removable bottom, the removable bottom further comprising a tether clip for receiving and securely retaining a tether coupled to an agitation device (shown in perspective view) in accordance with a representative embodiment of the present invention.

In some instances, the present invention provides a bottle nipple 164 that further comprises a tether 165 and an agitator device 167 to provide a monolithic structure, as shown in FIG. 14. The position at which tether 165 extends outwardly from nipple 164 is generally selected to avoid interference with threads 168 of cap 162. The position of tether 165 is further selected to avoid interference with the fluid pathway through nipple 164. In some instances, agitator device 167 comprises a shape and/or maximum outer diameter that prevents agitator device 167 from entering and/or blocking the fluid pathway through nipple 164.

Figure 16:
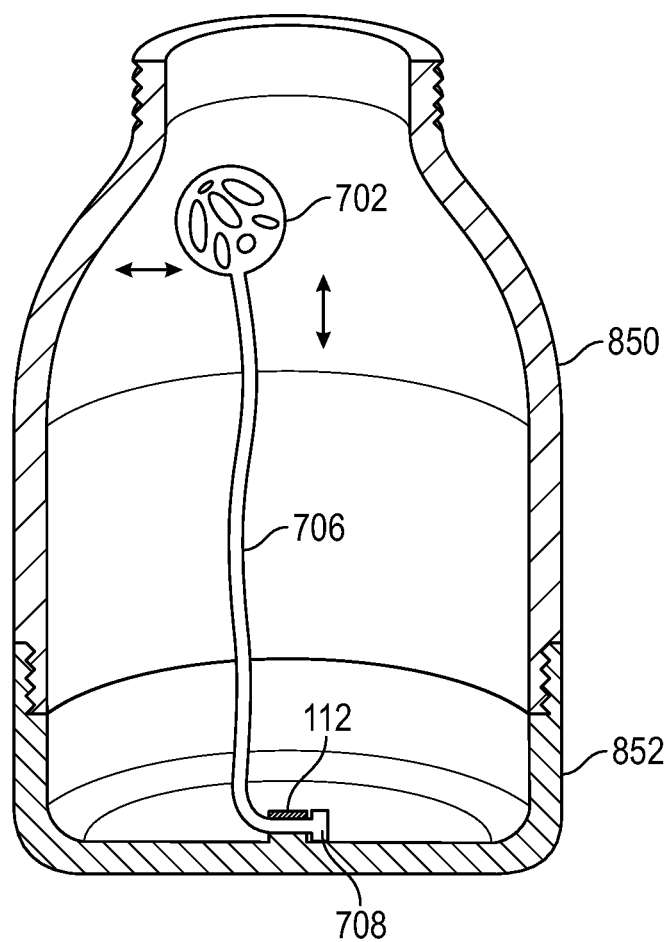
FIG. 16 is a cross-section view of the assembled container of FIG. 15, wherein the tether and agitation device are shown in perspective view, the tether being coupled to the removable bottom via the retainer clip in accordance with a representative embodiment of the present invention.

Some embodiments of the present invention further comprise a container 850 having a removable bottom 852, as shown in FIGS. 15-17C. Removable bottom 852 is secured to the top half of container 850 via a threaded, fluid-tight connection. In some instances, the inner surface of removable bottom 852 comprises a tether clip 112, in accordance with the description above. First end 708 of tether 706 is retained by tether clip 112 in an inverted orientation, as shown in FIG. 16. Upon agitation or shaking of container 850, agitation device is free to move around within the interior of container 850, as described previously.

Figure 17A:
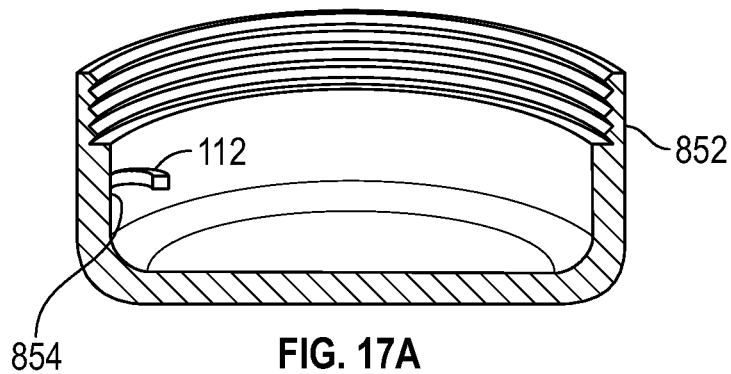
FIGS. 17A-17C provide cross-section views of various embodiments of the removable bottom of FIGS. 15 and 16, wherein FIG. 17A comprises a retainer clip located on a sidewall of the removable bottom, FIG. 17B comprises an annular channel formed on the sidewall of the removable bottom, and FIG. 17C comprises a port wherein the base of a tether is inserted through the port and secured to the inner surface of the removable bottom in accordance with various representative embodiments of the present invention.
Figure 17B:
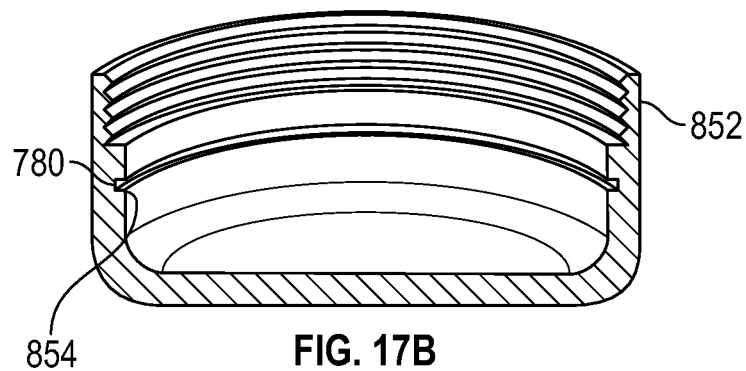
Figure 17C:
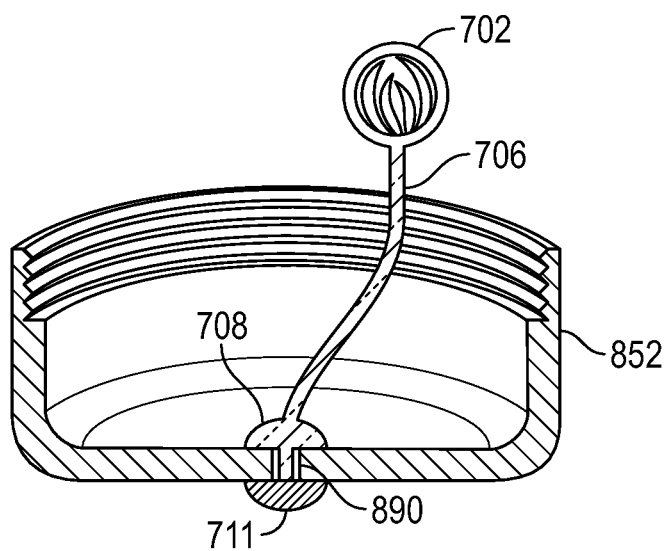

FIGS. 17A-17C provide cross-section views of removable bottom 852 illustrating various methods by which first end 708 may be anchored thereto. In some instances, an inner sidewall surface 854 of removable bottom 852 comprises a tether clip 112, as shown in FIG. 17A. In other instances, inner sidewall surface 854 comprises an annular groove 780 for receiving a retaining ring (not shown), as shown in FIG. 17B. Further, in some instances removable bottom 852 comprises a port 890 which provides a pathway through the bottom of removable bottom 852, as shown in FIG. 17C. Port 890 is configured to receive a portion of first end 708 that extends therethrough and is threadedly received by a tether nut 711. Upon threadedly securing first end 708 and nut 711, a fluid-tight seal is provided between first end 708 and the inner surface of removable bottom 852.

Figure 18:
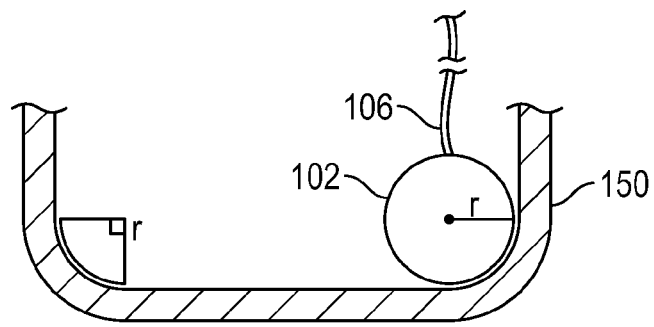
FIG. 18 is a cross-section view of a container comprising an inner corner having a radius that is approximately equal to the radius of an agitation device configured for use within the container, wherein the radius of the agitation device is compatible with the container in accordance with a representative embodiment of the present invention.

In some instances, agitator device 102 comprises a geometry specifically configured to maximize contact between agitator device 102 and the inner surface of container 150, a non-limiting example of which is shown in FIG. 18. In some embodiments, agitator device 102 comprises a radius r that is selected to be equal, or approximately equal to a radius r of an inner corner of container 150. As such, agitator device 102 may reach all interior surfaces of container 150.

Figure 19A:
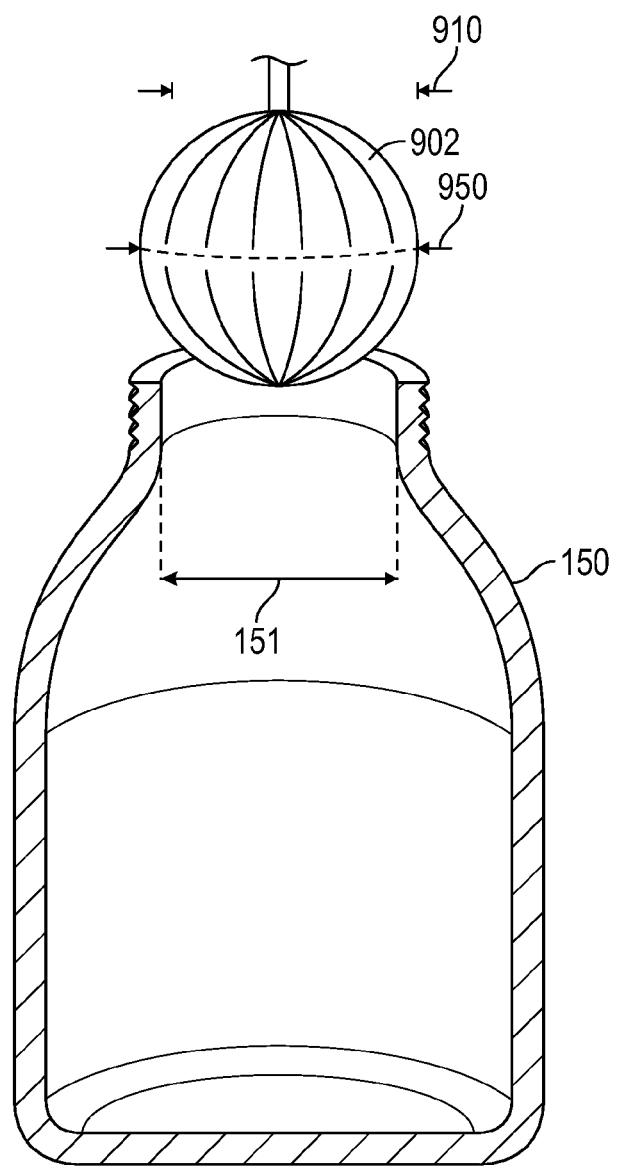

In some instances it may be desirable to minimized space between the inner surface of a container and an agitation device inserted therein. Where the opening of the container comprises a diameter that is less than the diameter of the inner surface of the container, it may be desirable to provide a collapsible agitator device 902, as shown in FIGS. 19A-19D. A collapsible agitator device may comprise any material or structure capable of providing the agitator device with a compressed or reduced state, and an uncompressed or expanded state. In some embodiments, the expanded state of agitator device 902 comprises a width 910 that is greater than the width 151 of the container opening, as shown in FIG. 19A. When compressed, the width 912 of agitator device 902 is less than width 151 of container 150, as shown in FIG. 19B.

Figure 19D:
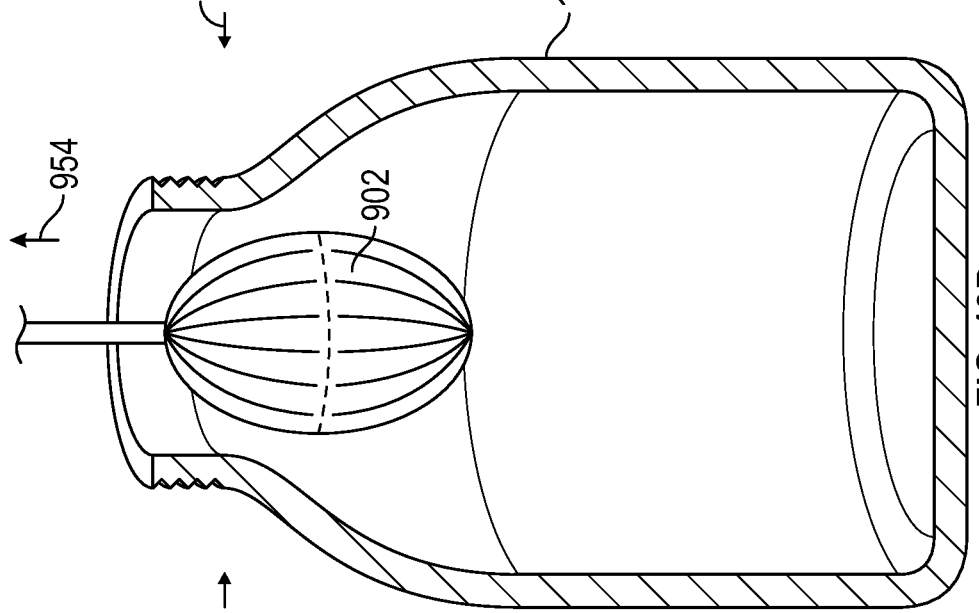

In some embodiments, agitator device 902 is compressed by manually pinching the sides of agitator device 902 in an inward direction 950, as shown in FIG. 19A. In other embodiments, agitator device 902 is compressed via contact between the outer surface of agitator device 902 and the inner surface of the container opening, as shown in FIG. 19D. Once compressed, agitator device 902 is able to be inserted into, or removed from container 150. Upon insertion into container 150, agitator device 902 expands outwardly 952 to contact the inner surface of the container opening. When agitator device 902 is positioned within the interior of container 150, the inner diameter 153 of the container interior is greater than the expanded diameter 910 of agitator device 902, such that agitator device 902 does not contact the inner surface, as shown in FIG. 19C. In some embodiments, the expanded diameter 910 of agitator device 902 is approximately the same as, or slightly less than inner diameter 153, whereby agitator device 902 contacts the inner surface of container 150 but is not prevented from moving or translating within container during agitation or shaking of container 150. To remove agitator device 902 from the interior of container 150, tether 906 is pulled in an upward direction 954, thereby causing agitator device 902 to contact the inner surface of the container opening and compress to the reduced state, as shown in FIG. 19D.

Figure 20B:
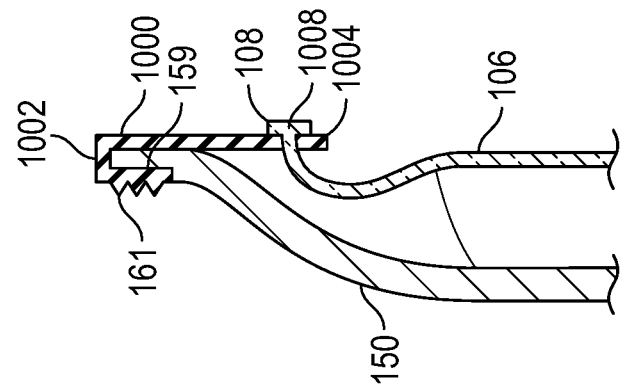
FIGS. 20A and 20B provide cross-section views of a tether anchor having various feature in accordance with various representative embodiments of the present invention.
Figure 20A:
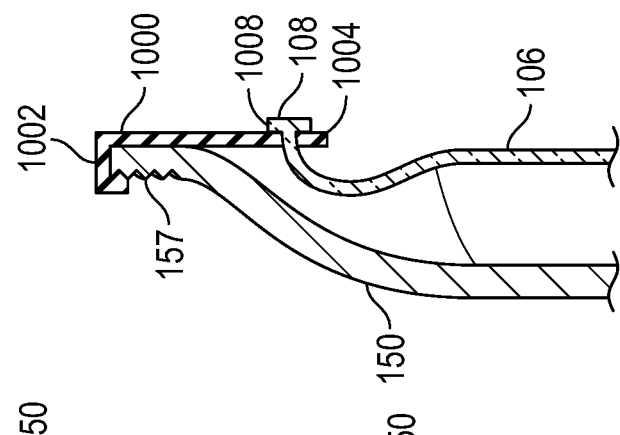

Some embodiments of the present invention further comprise a tether anchor 1000, as shown in FIGS. 20A and 20B. Tether anchor 1000 generally comprises a hook-shaped structure having a hook end 1002 which is secured over the opening of container 150, and further comprising a free end 1004 which is positioned within the interior of container 150 and comprises an aperture 1008 for receiving and securing first end 108 of tether 106. In some instances, hook end 1002 comprises a deformable material that extends over threads 157, as shown in FIG. 20A. The deformable material may be interposedly positioned between threads 157 and the container cap (not shown) without interfering with the threaded connection. For example, hook end 1002 may comprise an elastomeric material.

In other instances, hook end 1002 extends over a non-threaded surface 159 of the container opening, as shown in FIG. 20B. The non-threaded surface 159 may comprise the entire opening of container 150, or may comprise only a portion of the container opening. For example, in some instances non-threaded surface 159 comprises a vertical groove or channel that is provided in threads 157, wherein the vertical channel comprises a width and length that is approximately equal to the width and length of hook end 1002. In some embodiments, hook end 1002 comprises external threads 161 that are configured to threadedly receive the cap of the container.

Figure 21A:
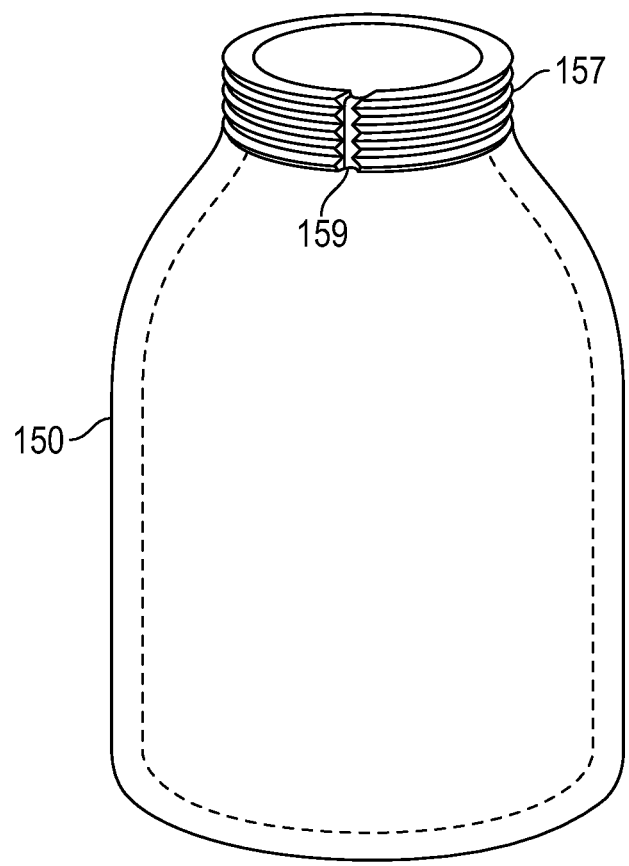
FIGS. 21A and 21B provide perspective and cross-section views of a container having a tether notch configured to accommodate a portion of the tether without compromising the threads of the container in accordance with a representative embodiment of the present invention.
Figure 21B:
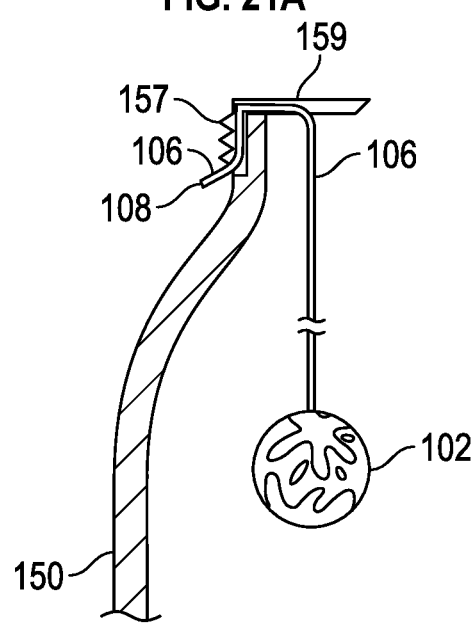

Referring now to FIGS. 21A and 21B, a container 150 comprising a non-threaded, vertical channel 159 is shown. In some instances, first end 108 of tether 106 is positioned within vertical channel 159 prior to securing the cap to container 150. Vertical channel 159 provides a pathway for tether 106 without compromising the threaded connection between the cap and container 150. In some instances, a portion of tether 106 is pinched between the cap and container 150 to secure tether 106 within vertical channel 159. In some instances, tether 106 provides a seal between the cap and vertical channel 159 thereby preventing leakage during agitation or shaking of container 150.

Figure 22:
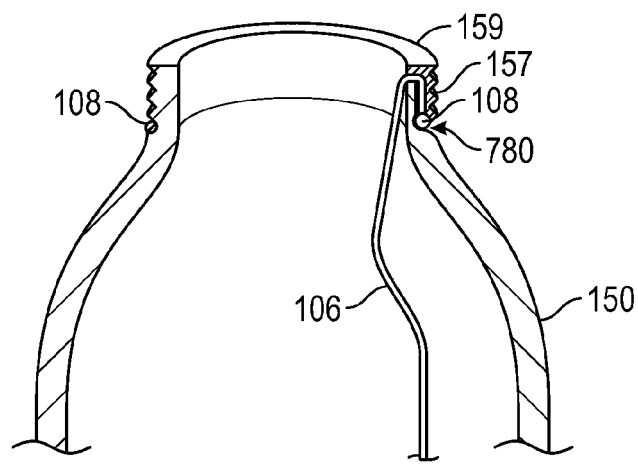
FIG. 22 shows a cross-section view of a container having a tether notch and further comprising an external annular channel configured to receive a retention band of the tether in accordance with a representative embodiment of the present invention.

In some embodiments, container 150 comprises an annular groove 780 formed at the base of threads 157 and in communication with non-threaded, vertical channel 159, as shown in FIG. 22. Annular groove 780 is configured to receive first end 108 of tether 106, wherein first end 108 comprises an elastic, annular ring forming a retention band. Retention band or first end 108 is seated into annular groove 780 such that tether 106 is aligned with and inserted within vertical channel 159. As with the embodiment shown in FIGS. 21A and 21B, in some instances tether 106 provides a seal between the cap and vertical channel 159 thereby preventing leakage during agitation or shaking of container 150.

Figure 23:
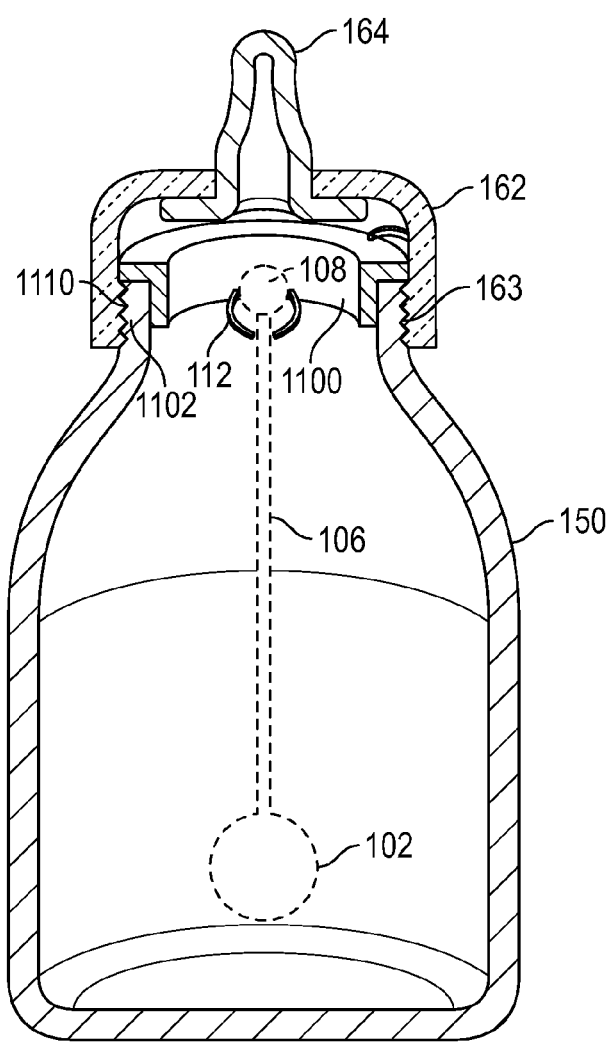
FIG. 23 shows a cross-section view of a container having an annular ledge formed near the opening of the container, the annular ledge being configured to receive a tether adapter ring, the tether adapter ring comprising an annular ring having an opening and an annular slot for receiving the annular ledge via a friction fit, the outer surface of the tether adapter ring further comprising a set of threads configured to threadedly receive a cap of the container, the inner surface of the tether adapter ring having tether clip in accordance with a representative embodiment of the present invention.
Figure 24A:
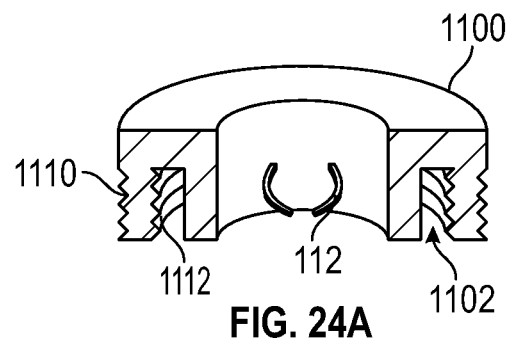
FIGS. 24A and 24B provide cross-section views of a tether adapter ring having an annular slot comprising a set of threads for threadedly receiving threads of the container, the outer surface of the tether adapter ring further comprising a second set of threads for threadedly receiving a cap of the container in accordance with a representative embodiment of the present invention.
Figure 24B:
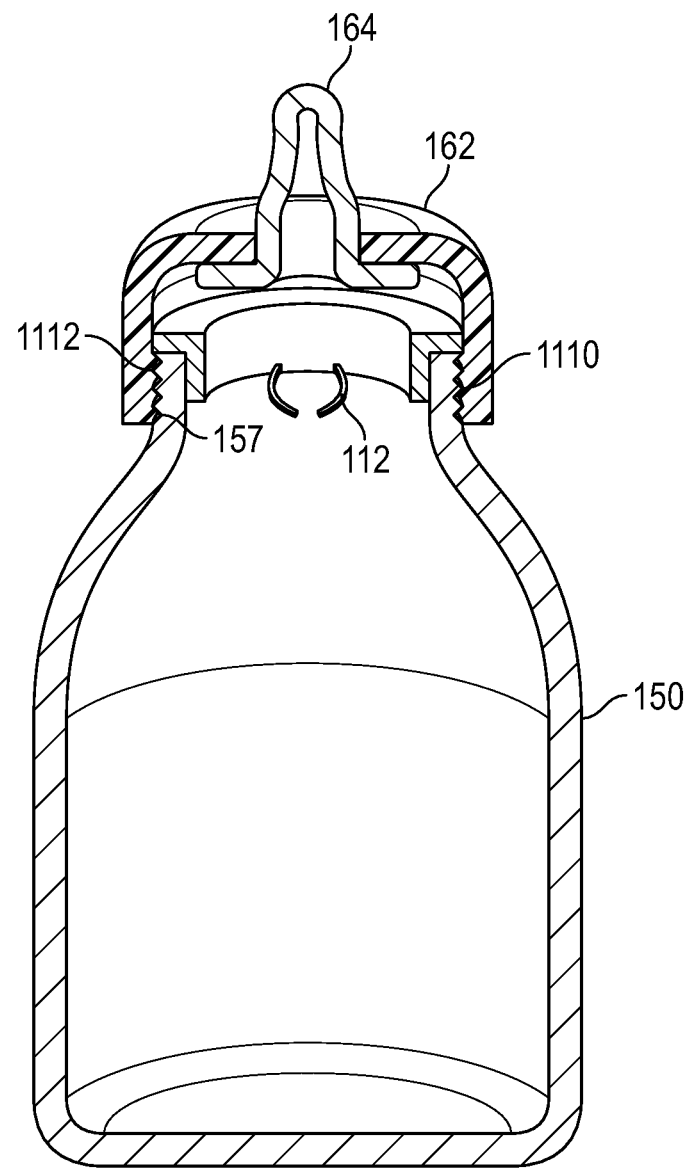

Referring now to FIGS. 23, 24A and 24B, some embodiments of the present invention comprise a tether adapter ring 1100. Tether adapter ring 1100 is generally configured to be placed over the entire opening of container 150, wherein a portion of the adapter ring 1100 is positioned outside the container 150 and a portion is positioned inside the container, the interior portion of the adapter ring 1100 further comprising one or more tether anchors, clips, apertures or other structures configured to receive tether 106.

In some embodiments, container 150 comprises a threadless, annular ledge 163 formed near the opening of container 150, the annular ledge 163 being configured to receive tether adapter ring 1100. Tether adapter ring 1100 comprises an opening and an annular slot 1102 for receiving annular ledge 163 via a friction fit. The outer surface of tether adapter ring 1100 further comprises a set of external threads 1110 for threadedly receiving cap 162 of container 150. In some embodiments, the inner surface of tether adapter ring 1100 further comprises a tether clip 112 for receiving the first end 108 of tether 106.

Referring now to FIGS. 24A and 24B, in some embodiments, annular slot 1102 of tether adapter ring 1100 further comprises a set of internal threads 1112 configured to threadedly engage threads 157 of container 150. Thus, tether adapter ring 1100 is secured to the opening of container 150 via a threaded connection. Tether adapter ring 1100 further comprises a set of external threads 1110 that is configured to threadedly receiving cap 162. The threaded connections between cap 162, tether adapter ring 1100, and container 150 each provide a fluid-tight seal, in accordance with the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An agitation assembly device, comprising:
    a tether having a first end, a second end, and a body extending therebetween;
    a retainer having an outer perimeter configured contact an opening of a container, and an inner perimeter defining a fluid pathway through the retainer, wherein said first end is coupled to at least one of the outer perimeter and a cross-member which intersects the fluid pathway; and
    an agitator device coupled to the second end.

2. The device of claim 1, wherein the tether comprises an elastic material.

3. The device of claim 1, wherein the retainer is configured to couple to a neck portion of the container.

4. The device of claim 3, wherein the retainer is configured to couple to the opening of the container by an interference fit.

5. The device of claim 1, wherein the tether and the agitator device comprise a monolithic structure.

6. The device of claim 1, wherein the retainer further comprises a lid.

7. The device of claim 1, wherein the retainer comprises a vent hole.

8. The device of claim 1, wherein the first end of the tether is inserted through an aperture of the retainer.

9. The device of claim 1, wherein the retainer further comprises a tether clip.

10. The device of claim 1, wherein the cross-member further comprises an aperture for receiving the first end of the tether.

11. The device of claim 1, wherein the retainer comprises a whisking element.

12. The device of claim 11, wherein the retainer comprises a whisk structure.

13. The device of claim 1, wherein the tether, retainer, and agitator device comprise a monolithic structure.

14. The device of claim 1, wherein the tether comprises an agitating element.

15. The device of claim 1, wherein the agitator device comprises a radius that is approximately equal to a radius of an interior surface of the container.

16. The device of claim 1, the agitator device comprises an expanded configuration and a collapsed configuration.

17. An agitator assembly device, comprising:
a tether having a first end, a second end, and a body extending therebetween;
a retainer having an outer perimeter configured to contact an opening of a container, and an inner perimeter defining a fluid pathway through the retainer, wherein said first end is coupled to at least one of the outer perimeter and a cross-member which intersects the fluid pathway;
a container having at least one of a) an inner surface comprising a tether clip configured to receive the first end of the tether, and b) an opening configured to receive the outer perimeter of the retainer; and
an agitator device coupled to the second end of the tether.

18. The device of claim 17, wherein the tether comprises an elastic material.

19. The device of claim 1, wherein the agitator device is fixedly coupled to the second end.

* * * * *